US012288406B2

(12) United States Patent
Bal et al.

(10) Patent No.: US 12,288,406 B2
(45) Date of Patent: Apr. 29, 2025

(54) UTILIZING MACHINE-LEARNING BASED OBJECT DETECTION TO IMPROVE OPTICAL CHARACTER RECOGNITION

(71) Applicant: Adobe Inc., San Jose, CA (US)

(72) Inventors: Ankit Bal, Noida (IN); Mohit Gupta, Noida (IN); Ram Bhushan Agrawal, Noida (IN); Tarun Verma, New Delhi (IN); Uttam Dwivedi, Noida (IN)

(73) Assignee: Adobe Inc., San Jose, CA (US)

( * ) Notice: Subject to any disclaimer, the term of this patent is extended or adjusted under 35 U.S.C. 154(b) by 520 days.

(21) Appl. No.: 17/490,610

(22) Filed: Sep. 30, 2021

(65) Prior Publication Data

US 2023/0094787 A1    Mar. 30, 2023

(51) Int. Cl.
*G06T 9/00* (2006.01)
*G06N 3/0442* (2023.01)
(Continued)

(52) U.S. Cl.
CPC ......... *G06V 30/153* (2022.01); *G06N 3/0442* (2023.01); *G06N 3/0455* (2023.01);
(Continued)

(58) Field of Classification Search
None
See application file for complete search history.

(56) References Cited

U.S. PATENT DOCUMENTS 5,757,957 A * 5/1998 Tachikawa ........... G06V 30/155
 382/176
5,761,344 A * 6/1998 Al-Hussein .......... G06V 30/162
 382/237
(Continued)

FOREIGN PATENT DOCUMENTS

CN   108875744 A  * 11/2018 ............. G06K 9/344
KR   20060030430 A *  4/2006
(Continued)

OTHER PUBLICATIONS

Javed et al., "Automatic page segmentation without decompressing the run-length compressed text documents." arXiv preprint arXiv:2007.01142 (2020). (Year: 2020).*

(Continued)

*Primary Examiner* — Feng Niu
(74) *Attorney, Agent, or Firm* — Keller Preece PLLC

(57) ABSTRACT

The present disclosure relates to systems, methods, and non-transitory computer readable media for accurately enhancing optical character recognition with a machine learning approach for determining words from reverse text, vertical text, and atypically-sized text. For example, the disclosed systems segment a digital image into text regions and non-text regions utilizing an object detection machine learning model. Within the text regions, the disclosed systems can determine reverse text glyphs, vertical text glyphs, and/or atypically-sized text glyphs utilizing an edge based adaptive binarization model. Additionally, the disclosed systems can utilize respective modification techniques to manipulate reverse text glyphs, vertical text glyphs, and/or atypically-sized glyphs for analysis by an optical character recognition model. The disclosed systems can further utilize an optical character recognition model to determine words from the modified versions of the reverse text glyphs, the vertical text glyphs, and/or the atypically-sized text glyphs.

20 Claims, 19 Drawing Sheets

(51) Int. Cl.
| | |
|---|---|
| *G06N 3/0455* | (2023.01) |
| *G06N 3/0464* | (2023.01) |
| *G06N 3/047* | (2023.01) |
| *G06N 3/0475* | (2023.01) |
| *G06N 3/084* | (2023.01) |
| *G06N 5/01* | (2023.01) |
| *G06N 7/01* | (2023.01) |
| *G06N 20/00* | (2019.01) |
| *G06N 20/10* | (2019.01) |
| *G06N 20/20* | (2019.01) |
| *G06T 3/60* | (2006.01) |
| *G06V 30/148* | (2022.01) |
| *G06V 30/162* | (2022.01) |
| *G06V 30/262* | (2022.01) |
| *G06V 30/413* | (2022.01) |

(52) U.S. Cl.
CPC ........... *G06N 3/0464* (2023.01); *G06N 3/047* (2023.01); *G06N 3/0475* (2023.01); *G06N 3/084* (2013.01); *G06N 5/01* (2023.01); *G06N 7/01* (2023.01); *G06N 20/00* (2019.01); *G06N 20/10* (2019.01); *G06N 20/20* (2019.01); *G06T 3/60* (2013.01); *G06V 30/15* (2022.01); *G06V 30/162* (2022.01); *G06V 30/262* (2022.01); *G06V 30/413* (2022.01)

(56) References Cited

U.S. PATENT DOCUMENTS

| | | | | |
|---|---|---|---|---|
| 5,778,092 | A * | 7/1998 | MacLeod | H04N 1/40062 382/233 |
| 5,867,277 | A * | 2/1999 | Melen | G06F 16/40 707/E17.022 |
| 7,054,485 | B2 * | 5/2006 | Li | H04N 1/4092 382/172 |
| 7,359,568 | B2 * | 4/2008 | Dobashi | G06V 10/44 382/181 |
| 7,437,002 | B2 * | 10/2008 | Tanaka | G06V 30/162 382/199 |
| 7,567,709 | B2 * | 7/2009 | Lim | G06T 7/12 382/176 |
| 7,751,648 | B2 * | 7/2010 | Tanaka | G06V 30/162 382/284 |
| 8,045,808 | B2 * | 10/2011 | Oliver | G06V 30/153 382/229 |
| 8,068,684 | B2 * | 11/2011 | Dauw | G06T 9/00 382/292 |
| 8,331,706 | B2 * | 12/2012 | Dauw | H04N 1/41 382/292 |
| 8,452,100 | B2 * | 5/2013 | Yoshino | G06V 30/18 382/218 |
| 8,457,426 | B1 | 6/2013 | Agrawal et al. | |
| 8,494,273 | B2 * | 7/2013 | Chevion | G06V 30/1914 382/168 |
| 8,666,185 | B2 * | 3/2014 | Dauw | H04N 1/41 382/292 |
| 8,995,780 | B2 * | 3/2015 | Dauw | G06V 30/413 382/292 |
| 10,176,409 | B2 * | 1/2019 | Xie | G06T 11/60 |
| 10,296,794 | B2 * | 5/2019 | Ratti | G06V 10/764 |
| 10,331,732 | B1 * | 6/2019 | McClain | G06V 10/751 |
| 10,489,126 | B2 * | 11/2019 | Kumar | G06V 30/422 |
| 10,679,089 | B2 * | 6/2020 | Annis | G06V 30/414 |
| 10,740,638 | B1 * | 8/2020 | Annis | G06V 30/412 |
| 11,295,123 | B2 * | 4/2022 | Duke | G06N 3/045 |
| 11,301,732 | B2 * | 4/2022 | Hu | G06F 18/256 |
| 11,636,699 | B2 * | 4/2023 | Han | G06V 10/22 382/103 |
| 11,721,119 | B2 * | 8/2023 | Prebble | G06V 30/413 382/176 |
| 11,900,644 | B2 * | 2/2024 | Maggio | G06F 40/279 |
| 11,995,907 | B2 * | 5/2024 | Parida | G06V 10/762 |
| 2003/0063802 | A1 * | 4/2003 | Li | G06T 7/194 382/199 |
| 2005/0008250 | A1 * | 1/2005 | Lim | G06V 30/162 382/266 |
| 2005/0047660 | A1 * | 3/2005 | Tanaka | G06V 30/162 382/176 |
| 2005/0168778 | A1 * | 8/2005 | Abe | G06T 11/60 358/1.18 |
| 2005/0219581 | A1 * | 10/2005 | Dobashi | G06V 10/44 358/1.9 |
| 2006/0098231 | A1 * | 5/2006 | Konishi | H04N 1/00092 358/3.21 |
| 2007/0154112 | A1 * | 7/2007 | Tanaka | G06V 30/162 382/284 |
| 2008/0131006 | A1 * | 6/2008 | Oliver | G06V 30/414 382/229 |
| 2008/0273807 | A1 * | 11/2008 | Dauw | G06V 10/761 382/237 |
| 2009/0028436 | A1 * | 1/2009 | Yoshino | G06V 30/18 382/190 |
| 2012/0063686 | A1 * | 3/2012 | Dauw | G06F 18/22 382/166 |
| 2012/0093412 | A1 * | 4/2012 | Dauw | G06V 30/413 382/218 |
| 2014/0177954 | A1 * | 6/2014 | Dauw | G06V 30/1902 382/164 |
| 2014/0193029 | A1 * | 7/2014 | Vassilieva | G06V 30/15 382/103 |
| 2018/0060704 | A1 * | 3/2018 | Xie | G06T 3/4046 |
| 2018/0211117 | A1 * | 7/2018 | Ratti | G06V 10/764 |
| 2019/0080164 | A1 * | 3/2019 | Duke | G06V 10/82 |
| 2019/0250891 | A1 * | 8/2019 | Kumar | G06T 7/70 |
| 2019/0266394 | A1 * | 8/2019 | Yu | G06V 30/413 |
| 2020/0089985 | A1 * | 3/2020 | Wang | G06V 30/1463 |
| 2021/0240975 | A1 * | 8/2021 | Sundell | G06V 30/18057 |
| 2021/0303939 | A1 * | 9/2021 | Hu | G06V 10/25 |
| 2021/0383105 | A1 * | 12/2021 | Han | G06N 3/045 |
| 2021/0383106 | A1 * | 12/2021 | Maggio | G06F 40/279 |
| 2022/0044146 | A1 * | 2/2022 | Gardner | G06V 10/22 |
| 2022/0198185 | A1 * | 6/2022 | Prebble | G06T 11/20 |
| 2022/0237933 | A1 * | 7/2022 | Mori | H04N 1/0044 |
| 2022/0237937 | A1 * | 7/2022 | Parida | G06F 16/55 |
| 2022/0319219 | A1 * | 10/2022 | Tsibulevskiy | G06V 30/226 |
| 2022/0343103 | A1 * | 10/2022 | Barzelay | G06V 30/414 |
| 2022/0415025 | A1 * | 12/2022 | Yamada | G06V 10/26 |
| 2023/0169784 | A1 * | 6/2023 | Rao | G06V 30/18 382/197 |
| 2023/0351115 | A1 * | 11/2023 | Zeng | G06V 30/413 |

FOREIGN PATENT DOCUMENTS

| | | | |
|---|---|---|---|
| RU | 2609069 C2 * | 1/2017 | |
| WO | WO-2020089985 A1 * | 5/2020 | |

OTHER PUBLICATIONS

Eikvil, "Optical character recognition." citeseer. ist. psu. edu/ 142042. html 26 (1993). (Year: 1993).*

Islam et al., "A survey on optical character recognition system." arXiv preprint arXiv:1710.05703 (2017). (Year: 2017).*

Mithe et al., "Optical character recognition." International journal of recent technology and engineering (IJRTE) 2, No. 1 (2013): 72-75. (Year: 2013).*

Machine translation of KR 20060030430 A (Year: 2006).*

Machine translation of CN 108875744 A (Year: 2018).*

Machine translation of RU 2609069 C2 (Year: 2017).*

* cited by examiner

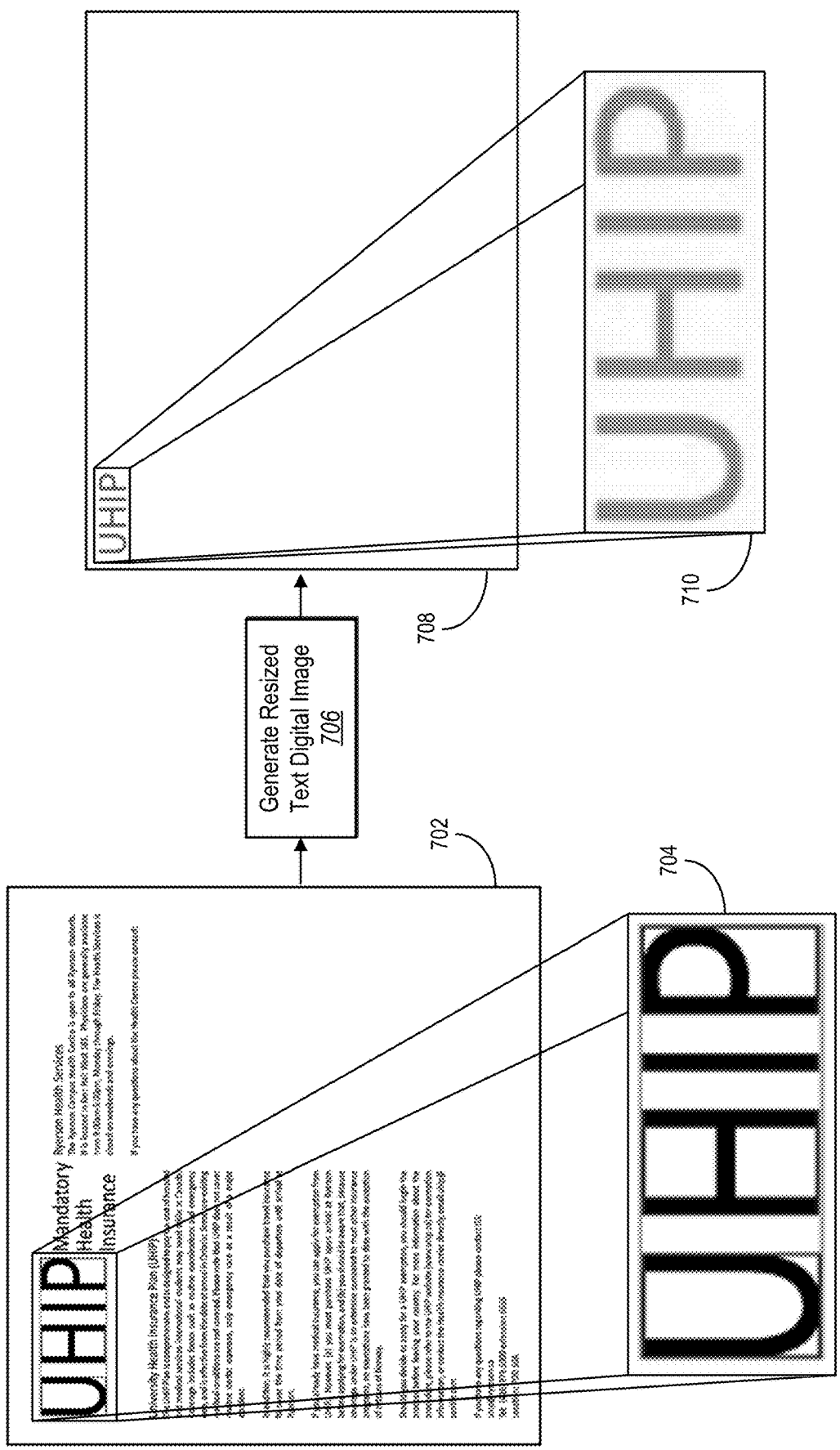

UTILIZING MACHINE-LEARNING BASED OBJECT DETECTION TO IMPROVE OPTICAL CHARACTER RECOGNITION

BACKGROUND

Existing hardware and software platforms provide systems and methods for recognizing characters or glyphs within digital images. For example, some existing character recognition systems utilize various types of optical character recognition models with varying capabilities to determine text glyphs depicted within digital images. Despite these advances, however, many conventional character recognition systems continue to demonstrate a number of deficiencies or drawbacks, particularly in their accuracy of identifying text glyphs in digital images.

For example, many conventional character recognition systems inaccurately determine text glyphs in special cases. Indeed, some existing systems inaccurately identify (or are incapable of identifying) text glyphs presented with particular characteristics within a digital image. For instance, due to the limitations of conventional character recognition systems, many existing systems inaccurately determine text glyphs arranged vertically. Indeed, conventional systems frequently extract glyphs in a left-to-right fashion according to an ordinary reading arrangement, and these systems are often not adaptable to identify glyphs that deviate from conventional arrangements.

In addition, some existing systems inaccurately identify reverse text glyphs, where the text glyphs are presented in a low contrast color against a high contrast background. Indeed, because many conventional character recognition systems are designed to identify dark text against a light background, these systems often miss text glyphs within reverse text regions of a digital image. In some cases, existing systems treat reverse text regions as graphics (as opposed to text) and ignore text glyphs within these regions entirely.

As another example, conventional character recognition systems often inaccurately determine text glyphs that are outside of a particular size range. Specifically, many existing systems either miss or ignore text glyphs that are smaller than a lower size limit or larger than an upper size limit. Indeed, many conventional systems are often limited to recognizing text glyphs from large bodies of text that have little or no variation in glyph size. As a result, these conventional systems frequently miss, or inaccurately identify, glyphs that are outside of a specific size range or with sizes that vary beyond a certain amount from the main body of text.

Thus, there are disadvantages regarding conventional character recognition systems.

SUMMARY

This disclosure describes one or more embodiments of systems, methods, and non-transitory computer readable media that solve one or more of the foregoing or other problems in the art with a machine learning approach for enhancing optical character recognition. For example, the disclosed systems segment a digital image into text regions and non-text regions utilizing an object detection machine learning model. Within the text regions, the disclosed systems determine reverse text glyphs, vertical text glyphs, and/or atypically-sized text glyphs utilizing an edge based adaptive binarization model. Additionally, the disclosed systems utilize respective modification techniques to modify reverse text glyphs, vertical text glyphs, and/or atypically-sized glyphs into formats more easily recognizable by an optical character recognition model. The disclosed systems further utilize an optical character recognition model to determine words from the modified versions of the reverse text glyphs, the vertical text glyphs, and/or the atypically-sized text glyphs. By utilizing a machine learning model and an edge based adaptive binarization model to identify reverse text glyphs, vertical text glyphs, and/or atypically-sized text glyphs, the disclosed systems accurately determine words from a digital image for cases in which conventional systems typically fail.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments with additional specificity and detail by referencing the accompanying figures. The following paragraphs briefly describe those figures, in which:

FIG. 7 illustrates an example of generating a resized text digital image in accordance with one or more embodiments;

DETAILED DESCRIPTION

Figure 1:
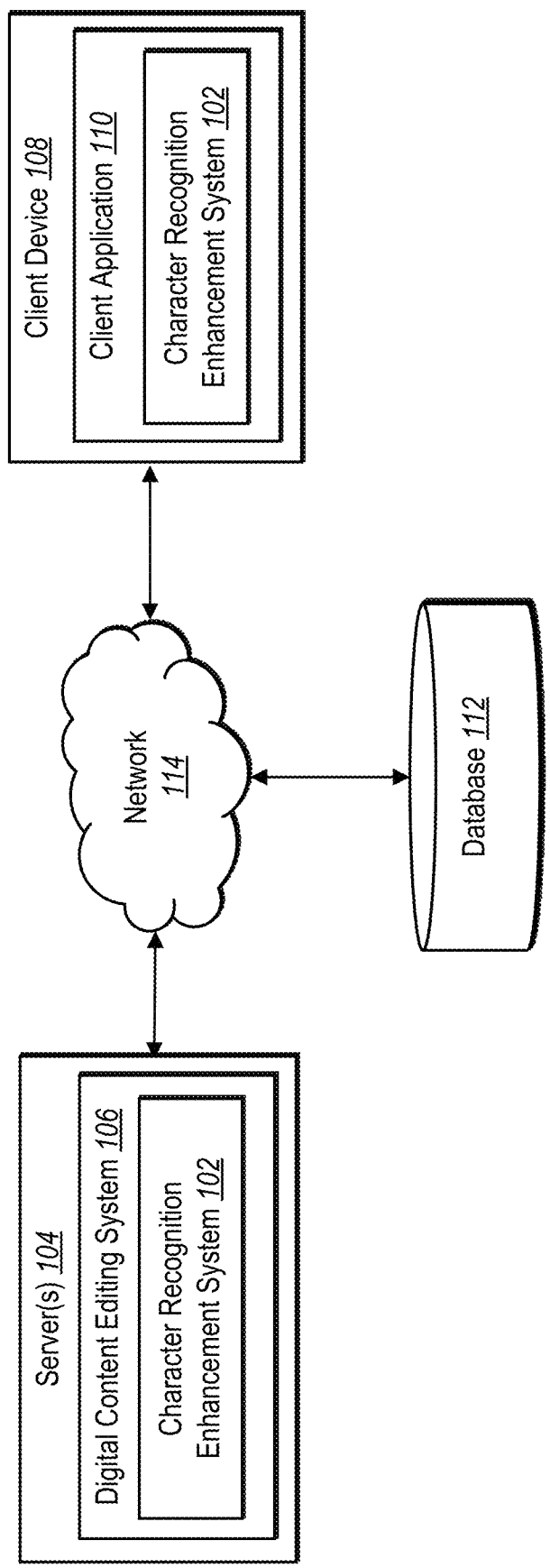
FIG. 1 illustrates an example system environment in which a character recognition enhancement system operates in accordance with one or more embodiments.

This disclosure describes one or more embodiments of a character recognition enhancement system that utilizes machine learning approaches to accurately and flexibly determines words from a digital image that includes reverse text glyphs, vertical text glyphs, and/or atypically-sized text glyphs. For example, the character recognition enhancement system segments a digital image into text regions and non-text regions utilizing an object detection machine learning model. In some cases, the character recognition enhancement system further determines text glyphs within the text regions, including reverse text glyphs, vertical text glyphs, and/or atypically-sized text glyphs. For instance, the character recognition enhancement system utilizes an edge based adaptive binarization model to determine bounding boxes designating the text glyphs within text regions. In some embodiments, the character recognition enhancement system further modifies the reverse text glyphs, the vertical text glyphs, and/or the atypically-sized text glyphs (e.g., via the edge based adaptive binarization model) and utilizes an optical character recognition model to determine words from the modified glyphs. In some cases, the character recognition enhancement system further generates a searchable version of the initial digital image based on the words determined from the modified text glyphs (and other text glyphs) of the text regions.

As just mentioned, in one or more embodiments, the character recognition enhancement system segments a digital image into text regions and non-text regions. For example, the character recognition enhancement system analyzes a digital image utilizing an object detection machine learning model to identify pixels, areas, or regions of the digital image that depict characters or text glyphs and pixels, areas, or regions of the digital image that depict visualizations other than text glyphs (e.g., pictures, graphics, or other portrayals).

In one or more embodiments, the character recognition enhancement system determines characteristics for the text regions that indicate text categories of the text regions (or of the digital image as a whole). For example, the character recognition enhancement system utilizes an edge based adaptive binarization model to determine characteristics indicating whether a given text region depicts reverse text glyphs, vertical text glyphs, and/or atypically-sized text glyphs. In some cases, the character recognition enhancement system further determines bounding boxes for the text glyphs utilizing respective techniques for the different types of glyphs (e.g., via the edge based adaptive binarization model).

As just mentioned, in one or more embodiments, the character recognition enhancement system determines words from a reverse text region of a digital image. For instance, the character recognition enhancement system utilizes an edge based adaptive binarization model to identify the reverse text region (e.g., based on a color scheme of the region) and to determine the reverse text glyphs within the reverse text region. In some cases, the character recognition enhancement system generates inverted text glyphs from the reverse text glyphs of the color region. Specifically, in some embodiments, the character recognition enhancement system inverts a color scheme of the reverse text region to swap a glyph color (e.g., a low contrast color) and a background color (e.g., a high contrast color) of the reverse text region. In these or embodiments, and as part of generating inverted text glyphs, the character recognition enhancement system converts the inverted colors to black and white (e.g., black text glyphs on a white background). In certain cases, the character recognition enhancement system generates bounding boxes designating or indicating the inverted text glyphs (e.g., as individual glyphs and/or as an inverted text glyph group including multiple inverted text glyphs). In some embodiments, the character recognition enhancement system further determines words from the inverted text glyphs indicated by the bounding boxes utilizing an optical character recognition model.

As mentioned above, in some embodiments, the character recognition enhancement system determines words from a vertical text region of a digital image. For instance, the character recognition enhancement system utilizes an edge based adaptive binarization model to identify the vertical text region and to determine the vertical text glyphs within the vertical text region. Specifically, in some embodiments, the character recognition enhancement system generates a dilated digital image by dilating the digital image in a horizontal direction to distinguish vertical text glyphs (or corresponding bounding boxes) from horizontal text glyphs (or corresponding bounding boxes). In some cases, the character recognition enhancement system generates a rotated text digital image (as a separate image from the initial digital image) from the vertical text glyphs by generating one or more rotated versions of the vertical text glyphs. In these or other cases, the character recognition enhancement system determines words from the rotated text digital image utilizing an optical character recognition model.

As mentioned, in certain embodiments, the character recognition enhancement system determines words from an atypically-sized text region of a digital image. For instance, the character recognition enhancement system utilizes an edge based adaptive binarization model to determine the atypically-sized text glyphs within the atypically-sized text region. Specifically, in some cases, the character recognition enhancement system identifies text glyphs that are smaller than a minimum size threshold or larger than a maximum size threshold. For instance, the character recognition enhancement system filters out glyphs with sizes that are between the maximum size threshold and the minimum size threshold. In certain embodiments, the character recognition enhancement system further generates a resized text digital image (as a separate image from the initial digital image) by resizing the atypically-sized digital image. In some embodiments, the character recognition enhancement system further determines words from the resized text digital image utilizing an optical character recognition model.

As mentioned above, in certain embodiments, the character recognition enhancement system further generates a searchable digital image from reverse text glyphs, the vertical text glyphs, and/or the atypically-sized text glyphs. For example, the character recognition enhancement system generates a digital image that appears visually the same as (or similar to) the initial digital image but that is searchable across all text regions, including reverse text regions, vertical text regions, and atypically-sized text regions. In some cases, the character recognition enhancement system provides the searchable digital image for display on a client device.

As suggested above, embodiments of the character recognition enhancement system provide certain improvements or advantages over conventional character recognition systems. For example, embodiments of the character recognition enhancement system improve accuracy over conventional systems. To elaborate, compared to conventional systems that cannot (or that inaccurately) determine words from reverse text, vertical text, and/or atypically-sized text of a digital image, the character recognition enhancement system utilizes an object detection model, an edge based adaptive binarization model, and various other techniques to identify and modify reverse text, vertical text, and atypically-sized text for optical character recognition. For instance, the character recognition enhancement system generates inverted text glyphs from a reverse text region, generates a rotated text digital image from a vertical text region, and/or generates a resized text digital image from an atypically-sized text region. Indeed, some embodiments of the character recognition enhancement system introduce new functionality not found in prior systems, including the ability to determine words from reverse text, vertical text, and/or atypically-sized text portrayed within a digital image.

Contributing at least in part to the improved accuracy of the character recognition enhancement system, some embodiments of the character recognition enhancement system are also more flexible than conventional character recognition systems. Indeed, while many prior systems are rigidly fixed to determine words from text having a very specific appearance (e.g., within a particular size range, in an upright orientation, and with a color scheme of dark text on a light background), the character recognition enhancement system is more flexibly adaptable to other circumstances. For instance, unlike existing systems, the character recognition enhancement system is able to flexibly determine words from reverse text regions, vertical text regions, and/or atypically-sized text regions of a digital image.

As suggested by the foregoing discussion, this disclosure utilizes a variety of terms to describe features and benefits of the character recognition enhancement system. Additional detail is hereafter provided regarding the meaning of these terms as used in this disclosure. In particular, the term the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of decision trees, support vector machines, Bayesian networks, linear regressions, logistic regressions, random forest models, or neural networks.

Generally, in one or more embodiments, a neural network includes a machine learning model that can be tuned (e.g., trained) based on inputs to approximate unknown functions used for generating the corresponding outputs. Indeed, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

An exemplary machine learning model that the character recognition enhancement system utilizes is an object detection machine learning model. As used herein, the term "object detection machine learning model" refers to a machine learning model that segments or partitions a digital image to detect or identify objects depicted within the digital image. For example, an object detection machine learning model can include a segmentation neural network that analyzes pixels of a digital image to detect edges or boundaries between objects. Indeed, the object detection machine learning model can determine sets of pixels that depict text glyphs and/or sets of pixels that depict other objects such as pictures, graphics, or backgrounds. In some cases, an object detection machine learning model is an object detection neural network as described by in U.S. Patent Application Publication No. 2019/0294661, entitled "Performing Semantic Segmentation of Form Images Using Deep Learning," which is incorporated by reference herein in its entirety that semantically classifies portions of a digital image as text runs, images (i.e., non-text), widgets (i.e., non-text), or other document element types.

Additionally, in some embodiments, the character recognition enhancement system determines text regions and non-text regions of a digital image utilizing the object detection machine learning model. As used herein, the term "text region" refers to an area or portion of a digital image that depicts characters or glyphs of text. For example, a text region includes a set of pixels that depicts one or more text glyphs. A text region can include: i) a "reverse text region," ii) a "vertical text region," iii) an "atypically-sized text region," or a common text region that is not a reverse text region, a vertical text region, or an atypically-sized text region. A "reverse text region" depicts "reverse text," such as light colored text against a dark colored background. In some cases, reverse text depicts light colored text (i.e., text with a color lighter than a lightness threshold or text with a contrast below a contrast threshold) against a dark colored background (i.e., a background with a color darker than a darkness threshold or background with a contrast above a contrast threshold). A "vertical text region" depicts "vertical text," such as a series of glyphs arranged or orientated vertically with respect to a digital image and read top-to-bottom or bottom-to-top (e.g., upright vertical text with no rotation in the glyphs or sideways vertical text with rotated glyphs). An "atypically-sized text region" depicts "atypically-sized text," such as text outside of a typical size range (e.g., glyphs smaller than a minimum size threshold or larger than a maximum size threshold). Relatedly, the term "non-text region" refers to an area or portion of a digital image that does not depict text or that depicts something other than text. For example, a non-text region includes a set of pixels that depicts a picture, a figure, blank space, or a graphic.

As mentioned above, in some embodiments, the character recognition enhancement system determines digital image categories for digital images or for individual text regions of digital images. For example, the character recognition enhancement system determines a "reverse text category" that refers to a category or classification indicating reverse text. As another example, the character recognition enhancement system determines a "vertical text category" that refers to a category or classification indicating vertical text. As yet another example, the character recognition enhancement system determines an "atypically-sized text category" that refers to a category or classification indicating atypically-sized text.

In one or more embodiments, the character recognition enhancement system generates inverted text glyphs from reverse text glyphs of a reverse text region. As used herein, the term "inverted text" refers to text that has been inverted from a first appearance to a second appearance. For example, inverted text includes text that has been inverted from reverse text with low contrast glyphs on a high contrast background to standard text with high contrast glyphs on a low contrast background. Along these, the term "inverted text glyph group" refers to a set of multiple inverted text glyphs grouped together. For instance, an inverted text glyph group is grouped together based on characteristics such as proximity to one another in vertical and horizontal directions.

As mentioned above, in some embodiments, the character recognition enhancement system utilizes an edge based adaptive binarization model to analyze or process digital images to determine digital image categories, generate bounding boxes for glyphs, and/or modify digital images according to characteristics of reverse text glyphs, vertical text glyphs, and/or atypically-sized text glyphs. As used herein, the term "edge based adaptive binarization model" refers to a heuristic model that extracts glyphs from a digital image and generates bounding boxes for the glyphs according to glyph-type-specific characteristics. For example, an edge based adaptive binarization model determines characteristics for reverse text glyphs, vertical text glyphs, and/or atypically-sized text glyphs, including color schemes, glyph sizes, and glyph orientations. In some embodiments, an edge based adaptive binarization model is as described in U.S. Pat. No. 8,457,426 entitled, "Method and Apparatus for Compressing a Document Using Pixel Variation Information," which is incorporated by reference herein in its entirety.

In certain embodiments, the character recognition enhancement system generates a searchable digital image for display on a client device. As used herein, the term "searchable digital image" refers to a digital image that includes searchable text. For example, a searchable digital image includes text glyphs processed by an optical character recognition model to make them searchable and/or selectable and that includes reverse text, vertical text, and/or atypically-sized text that is searchable and/or selectable.

In some embodiments, the character recognition enhancement system generates one or more auxiliary digital images at an intermediate stage between an initial digital image and a searchable digital image generated as a final output. In certain cases, the character recognition enhancement system generates an auxiliary digital image of a particular type (e.g., for a particular use case) such as a rotated text digital image (for vertical text glyphs), a resized text digital image (for atypically sized text glyphs), or an inverted text digital image (for reverse text glyphs). In one or more implementations, character recognition enhancement system generates a single auxiliary image for all/any use cases. More specifically, the character recognition enhancement system generates a rotated text digital image from vertical text glyphs and/or a resized text digital image from atypically-sized text glyphs. As used herein, the term "rotated text digital image" refers to a digital image that includes one or more sets of rotated glyphs. For example, a rotated text digital image includes multiple versions of a set of glyphs rotated a first amount (e.g., ninety degrees), a second amount (e.g., two hundred seventy degrees), and a third amount (e.g., to appear horizontal and upright). In some cases, a rotated text digital image includes only rotated glyphs and excludes other portions of text or graphics.

In addition, the term "resized text digital image" refers to a digital image that includes resized text glyphs. For example, a resized text digital image includes a version of atypically-sized text glyphs that have been resized for processing via an optical character recognition model. In some cases, a resized text digital image includes only resized text glyphs and excludes other portions of text or graphics.

In certain embodiments, the character recognition enhancement system generates a dilated digital image as part of identifying vertical text glyphs. As used herein, the term "dilated digital image" refers to a digital image where one or more portions have been dilated along a particular direction (or directions). For example, a dilated digital image includes a digital image that has been dilated, or stretched, in a horizontal direction (by a certain amount) to represent differences more starkly between vertical text glyphs (or their bounding boxes) and horizontal text glyphs (or their bounding boxes).

Additional detail regarding the character recognition enhancement system will now be provided with reference to the figures. For example, FIG. 1 illustrates a schematic diagram of an example system environment for implementing a character recognition enhancement system 102 in accordance with one or more embodiments. An overview of the character recognition enhancement system 102 is described in relation to FIG. 1. Thereafter, a more detailed description of the components and processes of the character recognition enhancement system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 14.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 14. Although FIG. 1 illustrates a single instance of the client device 108, in some embodiments, the environment includes multiple different client devices, each associated with a different user (e.g., a digital content editor). The client device 108 communicates with the server(s) 104 via the network 114. For example, the client device 108 provides information to server(s) 104 indicating client device interactions (e.g., digital image selections, text selections, or other input) and receives information from the server(s) 104 such as searchable digital images. Thus, in some cases, the character recognition enhancement system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images (searchable or otherwise).

As illustrated in FIG. 1, the environment includes the server(s) 104. The server(s) 104 generates, tracks, stores, processes, receives, and transmits electronic data, such as indications of digital image selections and/or text selections. For example, the server(s) 104 receives data from the client device 108 in the form of an indication of a client device interaction to convert a digital image to a searchable digital image. In response, the server(s) 104 transmits data to the client device 108 to cause the client device 108 to display or present a searchable digital image based on the interaction.

In some embodiments, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server. The server(s) 104 can further access and utilize the database 112 to store and retrieve information such as an edge based adaptive binarization model, an optical character recognition model, an object detection machine learning model, digital images, and/or searchable digital images.

As further shown in FIG. 1, the server(s) 104 also includes the character recognition enhancement system 102 as part of a digital content editing system 106. For example, in one or more implementations, the digital content editing system 106 can store, generate, modify, edit, enhance, provide, distribute, and/or share digital content, such as digital images. For example, the digital content editing system 106 provides tools for the client device 108 to, via the client application 110, read and manipulate text within digital images and/or to modify the appearance of a digital image by adding, removing, or manipulating objects within the digital image. In some implementations, the digital content editing system 106 provides tools for determining words within digital images by utilizing an object detection machine learning model, an edge based adaptive binarization model, and/or an optical character recognition model.

In one or more embodiments, the server(s) 104 includes all, or a portion of, the character recognition enhancement system 102. For example, the character recognition enhancement system 102 operates on the server(s) to determine words from digital images and provide searchable digital images. In some cases, the character recognition enhancement system 102 utilizes, locally on the server(s) 104 or from another network location (e.g., the database 112), an object detection machine learning model, an edge based adaptive binarization model, and an optical character recognition model to determine words from reverse text glyphs, vertical text glyphs, and/or atypically-sized text glyphs within a digital image.

In certain cases, the client device 108 includes all or part of the character recognition enhancement system 102. For example, the client device 108 can generate, obtain (e.g., download), or utilize one or more aspects of the character recognition enhancement system 102, such as an object detection machine learning model, an edge based adaptive binarization model, and/or an optical character recognition model from the server(s) 104. Indeed, in some implementations, as illustrated in FIG. 1, the character recognition enhancement system 102 is located in whole or in part of the client device 108. For example, the character recognition enhancement system 102 includes a web hosting application that allows the client device 108 to interact with the server(s) 104. To illustrate, in one or more implementations, the client device 108 accesses a web page supported and/or hosted by the server(s) 104.

Although FIG. 1 illustrates a particular arrangement of the environment, in some embodiments, the environment has a different arrangement of components and/or may have a different number or set of components altogether. For instance, as mentioned, the character recognition enhancement system 102 is implemented by (e.g., located entirely or in part on) the client device 108. In addition, in one or more embodiments, the client device 108 communicates directly with the character recognition enhancement system 102, bypassing the network 114. Further, in some embodiments, the environment includes an object detection machine learning model, an edge based adaptive binarization model, and/or an optical character recognition model stored in the database 112, maintained by the server(s) 104, the client device 108, or a third-party device.

Figure 2:
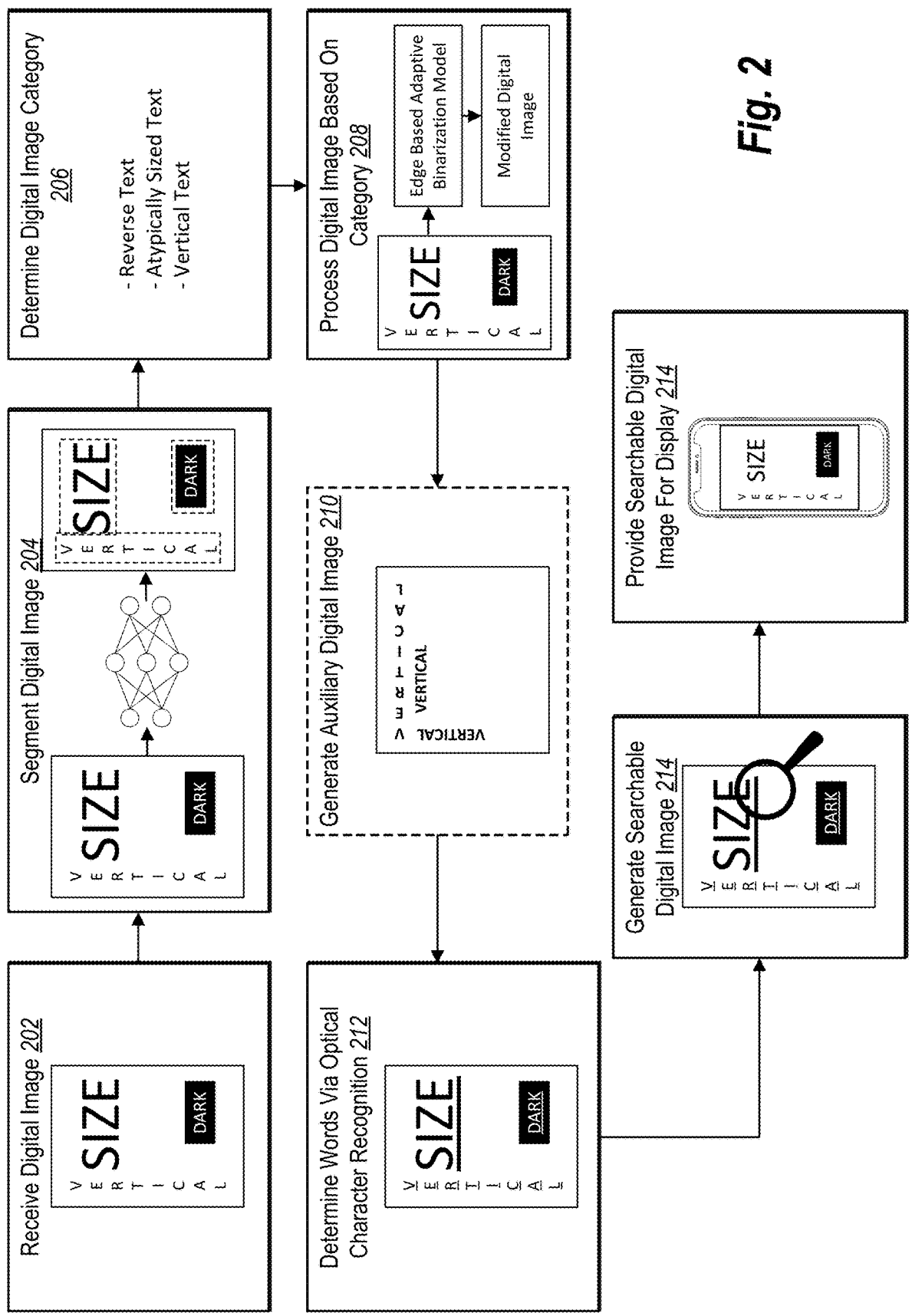
FIG. 2 illustrates an overview of determining words from reverse text, vertical text, and/or atypically-sized text in accordance with one or more embodiments.

As mentioned, in one or more embodiments, the character recognition enhancement system 102 generates a searchable digital image from a digital image that includes reverse text, vertical text, and/or atypically-sized text. In particular, the character recognition enhancement system 102 utilizes an object detection machine learning model, an edge based adaptive binarization model, and/or an optical character recognition model to generate a searchable digital image. FIG. 2 illustrates an overview of generating a searchable digital image from reverse text, vertical text, and/or atypically-sized text in accordance with one or more embodiments. Thereafter, additional detail regarding the specific acts illustrated in FIG. 2 is provided with reference to subsequent figures.

As illustrated in FIG. 2, the character recognition enhancement system 102 performs an act 202 to receive a digital image. In particular, the character recognition enhancement system 102 receives (or otherwise accesses) a digital image from the client device 108 or the database 112. For example, the character recognition enhancement system 102 receives the digital image in response to user interaction to select the digital image from the database 112 or upload the digital image from the client device 108. As shown, the digital image includes various text portions, including reverse text, vertical text, and/or atypically-sized text.

As further illustrated in FIG. 2, the character recognition enhancement system 102 performs an act 204 to segment the digital image. In particular, the character recognition enhancement system 102 utilizes an object detection machine learning model segment the digital image into text regions and non-text regions. For example, the character recognition enhancement system 102 determines, detects, or identifies text regions that depict text glyphs and determines, detects, or identifies non-text regions that do not depict text glyphs. In some cases, the character recognition enhancement system 102 utilizes the object detection machine learning model to determine probabilities corresponding to different regions of the digital image corresponding to text regions or non-text regions.

Additionally, the character recognition enhancement system 102 performs an act 206 to determine a digital image category for the digital image. In particular, the character recognition enhancement system 102 determines one or more digital image categories for the digital image by determining specific categories for individual text regions of the digital image. For instance, the character recognition enhancement system 102 determines that a given text region belongs to a reverse text category, a vertical text category, and/or an atypically-sized text category based on the glyphs within the text region. In cases where a digital image includes only one type or category of text region (e.g., one of reverse text, vertical text, or atypically-sized text), the character recognition enhancement system 102 can further designate the digital image as a whole as corresponding category.

In some embodiments, the character recognition enhancement system 102 determines the digital image category by utilizing an edge based adaptive binarization model to determine characteristics associated with the digital image. More specifically, the character recognition enhancement system 102 determines characteristics such as a color scheme that reflects a reverse text property, an orientation of text glyphs that reflects a vertical text property, and/or a text size that reflects atypically-sized text. Additional detail regarding determining characteristics of digital images indicating various categories is provided below with reference to subsequent figures.

As further illustrated in FIG. 2, the character recognition enhancement system 102 performs an act 208 to process the digital image based on the category (or categories) of respective text regions. In particular, the character recognition enhancement system 102 utilizes the edge based adaptive binarization model to generate a modified digital image from the initial digital image based on the characteristics of the respective text regions. For instance, the character recognition enhancement system 102 generates a modified digital image that includes bounding boxes indicating or designated various glyphs within the text regions.

In some cases, the character recognition enhancement system 102 utilizes different techniques (via the edge based adaptive binarization model) to generate bounding boxes, respectively, for reverse text regions, vertical text regions, and/or atypically-sized text regions. For example, the character recognition enhancement system 102 generates inverted text glyphs from reverse text glyphs of a reverse text region. As another example, as illustrated in FIG. 2, the character recognition enhancement system 102 performs an act 210 to generate an auxiliary digital image. For instance, the character recognition enhancement system 102 generates an auxiliary digital image intermediate between an initial digital image (e.g., received via the act 202) and a searchable digital image generated as final output to the client device 108. In some cases, the character recognition enhancement system 102 generates an auxiliary digital image in the form of a rotated text digital image or a resized text digital image. Additional detail regarding the various techniques for processing different text regions and generating auxiliary digital images is provided below with reference to subsequent figures.

As further illustrated in FIG. 2, the character recognition enhancement system 102 performs an act 212 to determine words via optical character recognition. In particular, the character recognition enhancement system 102 utilizes an optical character recognition model to determine words from various text regions of the initial digital image and from one or more auxiliary digital images. For instance, the character recognition enhancement system 102 utilizes an optical character recognition model to determine words from one or more auxiliary images. In some cases, the character recognition enhancement system 102 determines words from inverted text glyphs (generated from a reverse text region) of an inverted text digital image, from a rotated text digital image (generated from a vertical text region), and/or from a resized text digital image (generated from an atypically-sized text region). Additionally, if the digital image includes common text (i.e., text that is not one of the special cases of reverse text, vertical text, or atypically-sized text), the character recognition enhancement system 102 utilizes the optical character recognition model to determine words without prior process (e.g., passes the common text directly to the OCR model).

As illustrated in FIG. 2, the character recognition enhancement system 102 also performs an act 214 to generate a searchable digital image. In particular, the character recognition enhancement system 102 generates a digital image that includes selectable, searchable text glyphs as a result of utilizing the optical character recognition model. In some case, the character recognition enhancement system 102 generates the searchable digital image by combining an auxiliary digital image (that has been processed via optical character recognition) with one or more other text boxes extracted from the initial digital image. In certain embodiments, the character recognition enhancement system 102 generates the searchable digital image to appear the same as, or similar to, the initial digital image, but with searchable text, even for reverse text, vertical text, and/or atypically-sized text.

As also illustrated in FIG. 2, the character recognition enhancement system 102 performs an act 214 to provide the searchable digital image for display. More specifically, the character recognition enhancement system 102 provides the searchable digital image for display on the client device. For instance, the character recognition enhancement system 102 provides the searchable digital image for display as part of the client application 110, including various search and selection functionality.

Figure 3:
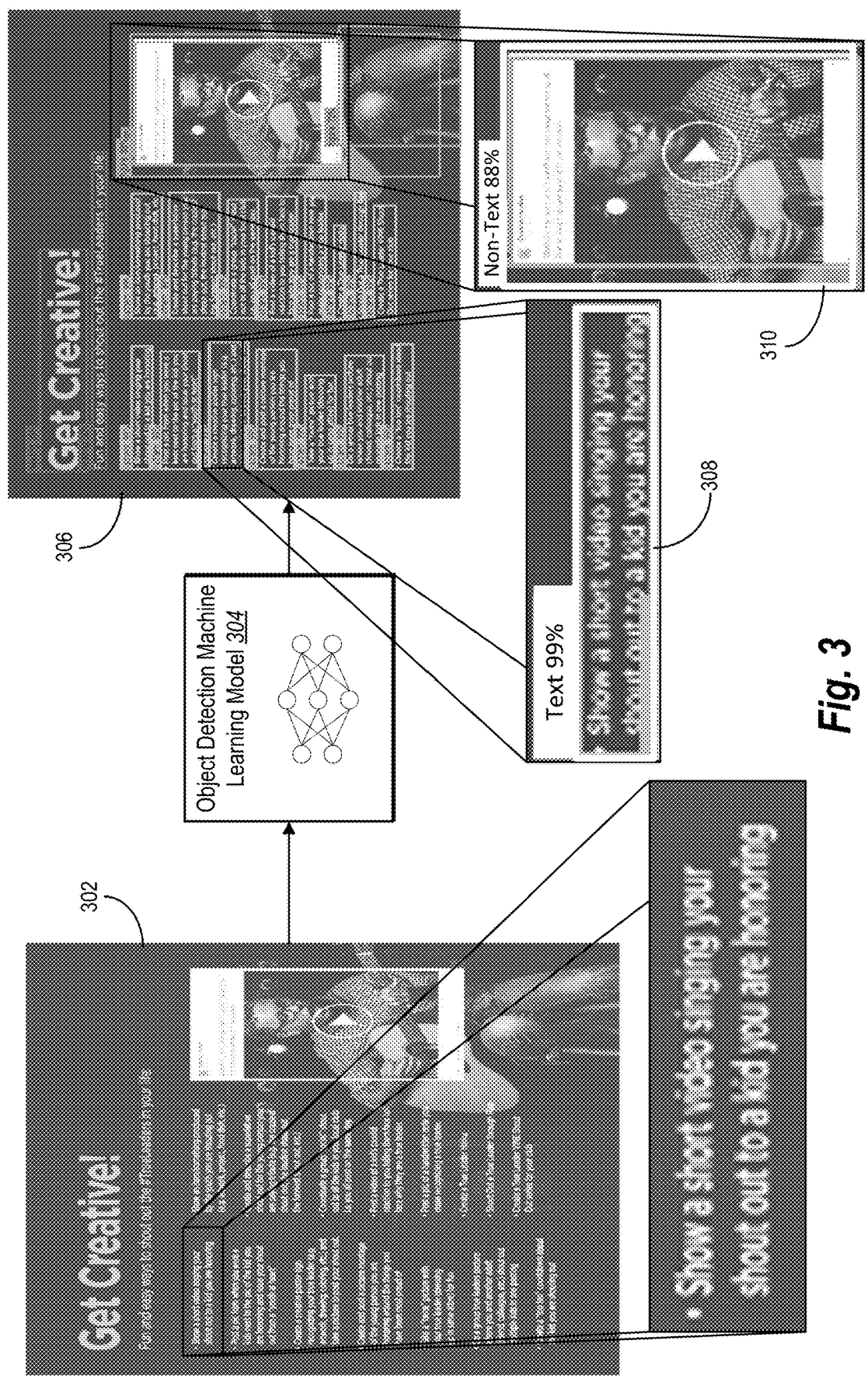
FIG. 3 illustrates an example of segmenting a digital image into text regions and non-text regions in accordance with one or more embodiments.

As mentioned above, in certain embodiments, the character recognition enhancement system 102 segments a digital image into text regions and non-text regions. In particular, the character recognition enhancement system 102 utilizes an object detection machine learning model to identify portions of a digital image that depict text and portions of the digital image that depicts something other than text. FIG. 3 illustrates an example of segmenting a digital image into text regions and non-text regions in accordance with one or more embodiments.

As illustrated in FIG. 3, the character recognition enhancement system 102 analyzes the digital image 302 utilizing the object detection machine learning model 304. In turn, the object detection machine learning model 304 generates the segmented digital image 306 that reflects text regions and non-text regions. To elaborate, the character recognition enhancement system 102 utilizes the object detection machine learning model 304 to determine edges or boundaries between sets of pixels that depict text glyphs and sets of pixels that depict other graphics.

Indeed, in some embodiments the object detection machine learning model 304 encodes (e.g., via an encoder neural network) the digital image 302 into a feature map of latent features representing the various portions or pixels of the digital image 302. In addition, the object detection machine learning model 304 processes the feature map (e.g., via one or more decoder neural networks) to classify features corresponding to individual pixels (or set of pixels) as belonging to a text category or a non-text category. In some embodiments, the character recognition enhancement system 102 designates a region as a text region upon determining that a probability that the pixels of the region (or the corresponding latent features) correspond to a text category satisfies a threshold probability. Conversely, the character recognition enhancement system 102 designates a region as a non-text region based on determining that the probability of depicting text does not satisfy the threshold probability, or based on determining that a probability of depicting non-text graphics satisfies a threshold probability (e.g., the same threshold probability or a different threshold probability).

In some cases, the character recognition enhancement system 102 determines probabilities associated with particular types of text regions. Indeed, the character recognition enhancement system 102 utilizes the object detection machine learning model 304 to detect indicators such as text size, text location, list markers (e.g., bullet points), underlines, italics, and other indicators that designate text and/or that differentiate one type of text from another. Thus, in some embodiments, the character recognition enhancement system 102 generates, as part of identifying text regions, probabilities of pixels corresponding to particular text classes, such as titles, header, list items, paragraphs, or others.

As shown in FIG. 3, the character recognition enhancement system 102 thus generates the segmented digital image 306 that indicates text regions and non-text regions, along with prediction probabilities for each. For example, the character recognition enhancement system 102 determines a text probability of 99% for the text region 308 and a non-text probability of 88% for the non-text region 310. Likewise, the character recognition enhancement system 102 determines text probabilities and non-text probabilities for the other indicated regions of the segmented digital image 306. Indeed, unlike many prior systems, by utilizing the object detection machine learning model 304, the character recognition enhancement system 102 is able to identify text regions that include reverse text, vertical text, and/or atypically-sized text.

In some cases, the digital content editing system 106 trains the object detection machine learning model 304, including any constituent neural networks or other internal components. Thus, the digital content editing system 106 trains the object detection machine learning model 304 to identify text within the digital image 302 based on multiple training iterations with sample digital images and ground truth indications of which regions depict text and which regions depict non-text graphics.

For a given training iteration, for instance, the digital content editing system 106 and/or the character recognition enhancement system 102 can input a sample digital image into the object detection machine learning model 304, whereupon the object detection machine learning model 304 generates a prediction of text regions and non-text regions for the sample digital image. In addition, the character recognition enhancement system 102 compares the prediction with a ground truth indication of text regions and non-text regions (e.g., stored within the database 112 as corresponding to the sample digital image) utilizing a loss function (e.g., a cross entropy loss function or a mean square error loss function) to determine a measure of loss between the prediction and the ground truth. The character recognition enhancement system 102 further back propagates to modify internal parameters (e.g., weights and biases) of the object detection machine learning model 304 to reduce the measure of loss. The character recognition enhancement system 102 continues this process for multiple iterations, with new sample digital images, comparisons, and parameter modifications, for a threshold number of iterations and/or until the measure of loss satisfies a threshold.

Figure 4A:
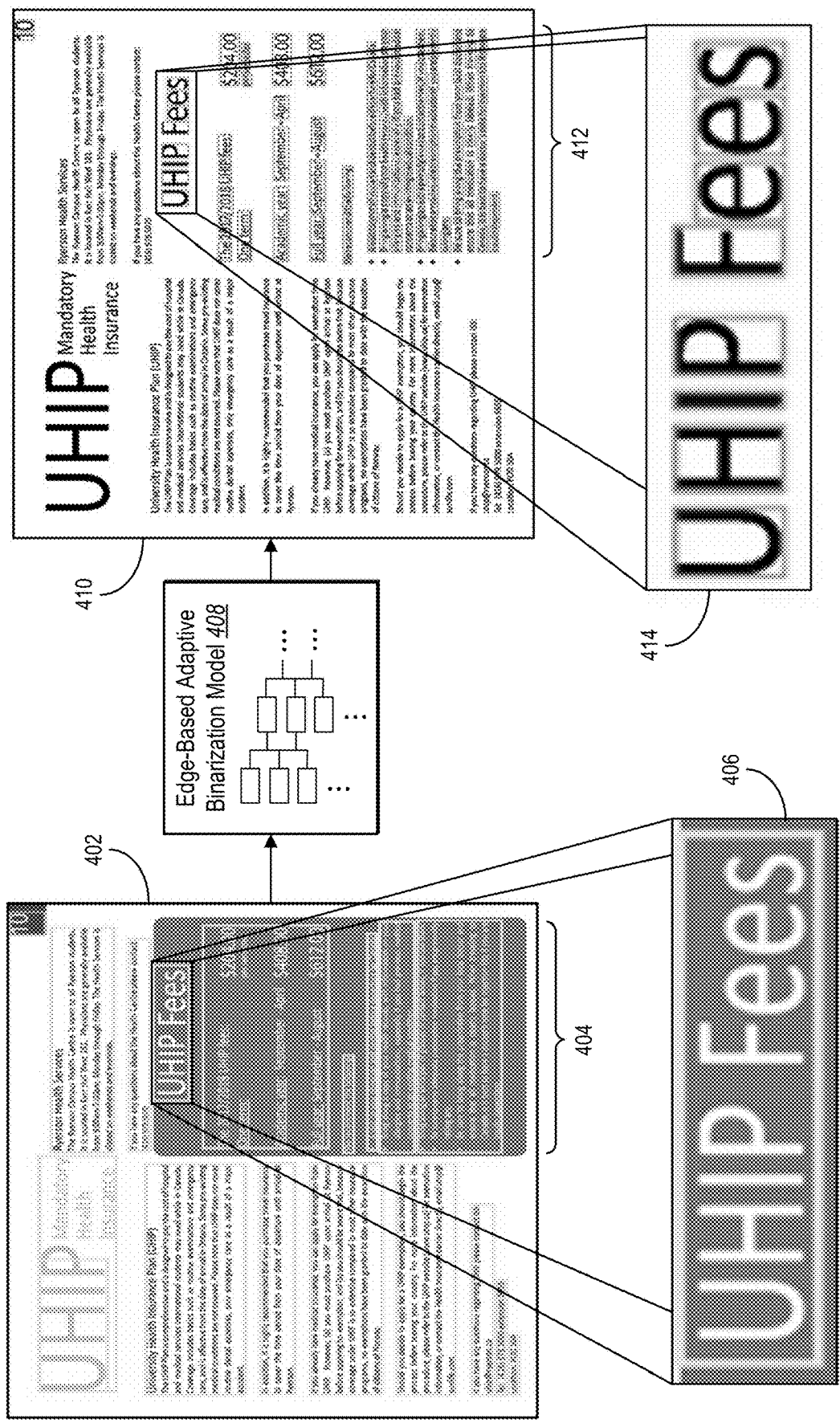
FIG. 4A illustrates an example of generating inverted text for an inverted text region from a reverse text region in accordance with one or more embodiments.

As mentioned, in certain described embodiments, the character recognition enhancement system 102 generates bounding boxes for text glyphs within a digital image. In particular, the character recognition enhancement system 102 generates bounding boxes to indicate reverse text glyphs, vertical text glyphs, and/or atypically-sized text glyphs. FIG. 4A illustrates an example for generating bounding boxes for reverse text glyphs in accordance with one or more embodiments.

As illustrated in FIG. 4A, the character recognition enhancement system 102 generates a modified digital image 410 depicting inverted text glyphs 414 with corresponding bounding boxes. In particular, the character recognition enhancement system 102 identifies the reverse text region 404 within the digital image 402. Indeed, the character recognition enhancement system 102 identifies the reverse text region that depicts text glyphs in low contrast against a high contrast background. For instance, the reverse text glyphs 406 read "UHIP Fees" in white letters against a gray background.

Additionally, the character recognition enhancement system 102 utilizes the edge based adaptive binarization model 408 to generate the modified digital image 410. In particular, the character recognition enhancement system 102 utilizes the edge based adaptive binarization model 408 to identify the reverse text region 404 and generate, within the modified digital image 410, an inverted text region 412 in place of the reverse text region 404. To accomplish this, the character recognition enhancement system 102 utilizes the edge based adaptive binarization model 408 to isolate the reverse text region 404, determine a color scheme for the reverse text region 404 (e.g., reflecting foreground and background colors), invert the color scheme by swapping the foreground (e.g., text) color and background color, and convert the newly swapped color scheme the black and white (e.g., black text against a white background). Thus, the character recognition enhancement system 102 generates a converted glyph color (e.g., black) and a converted background color (e.g., white).

To elaborate, the character recognition enhancement system 102 utilizes the edge based adaptive binarization model 408 to generate a binary mask that indicates pixel values (e.g., color values) for the reverse text region 404. In addition, the edge based adaptive binarization model 408 generates the binary mask to indicate whether particular pixel values are retrieved from foreground (e.g., text glyphs) or background portions of the reverse text region 404. For instance, the character recognition enhancement system 102 utilizes the edge based adaptive binarization model 408 to determine, within the pixel mask, color values for pixels that correspond to groups of connected pixels to indicate text glyphs (and/or background pixels). Further, the character recognition enhancement system 102 utilizes the edge based adaptive binarization model 408 to invert the color scheme of the reverse text region 404 by swapping the pixel values (e.g., the color values) of the text glyphs identified via the binary mask (e.g., the foreground pixels) with the pixels values of the background pixels.

In addition, the character recognition enhancement system 102 utilizes the edge based adaptive binarization model 408 to convert the inverted colors of the reverse text region 404 to black and white. To elaborate, upon inverting the color scheme of the reverse text region 404 (e.g., to swap the glyph color with the background color), the character recognition enhancement system 102 further converts the now-inverted glyph color to black and converts the now-inverted background color to white. In addition, the character recognition enhancement system 102 generates bounding boxes to indicate or designate each of the inverted text glyphs 414 (e.g., via the edge based adaptive binarization model 408). As shown, the inverted text glyphs 414 read "UHIP Fees" in black text against a white background with surrounding bounding boxes. The character recognition enhancement system 102 thus generates the modified digital image 410 for input into an optical character recognition model to thereby determine words.

Figure 4B:
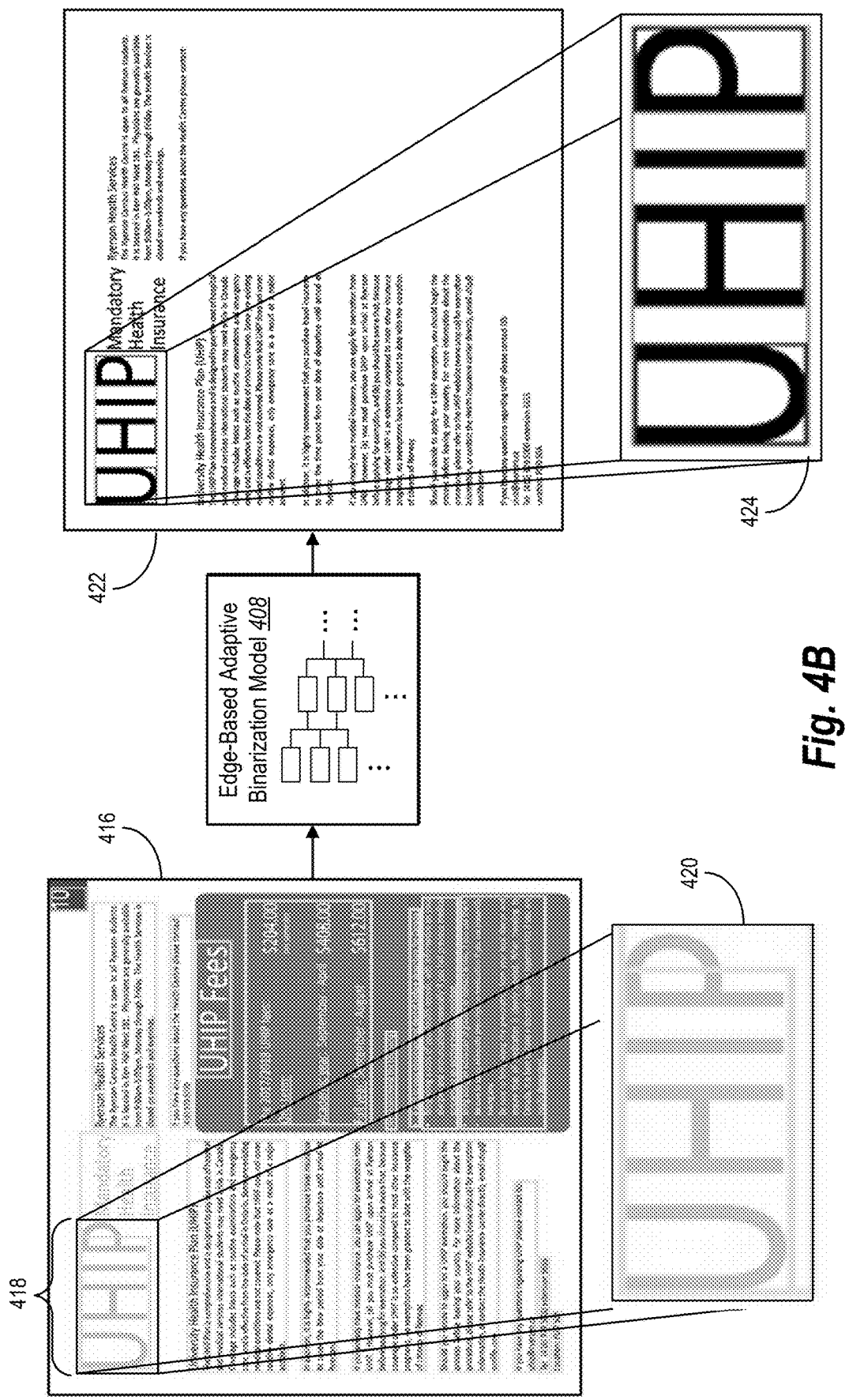
FIG. 4B illustrates an example of determining atypically-sized text from a digital image in accordance with one or more embodiments.

As mentioned, in some embodiments, the character recognition enhancement system 102 generates bounding boxes for atypically-sized text glyphs. In particular, the character recognition enhancement system 102 generates bounding boxes that designate text glyphs smaller than a threshold minimum size and/or text glyphs larger than a threshold maximum size. FIG. 4B illustrates generating bounding boxes for atypically-sized text glyphs in accordance with one or more embodiments.

As illustrated in FIG. 4B, the character recognition enhancement system 102 generates a modified digital image 422 depicting atypically-sized text glyphs 424 with corresponding bounding boxes. In particular, the character recognition enhancement system 102 identifies atypically-sized text glyphs 420 within the digital image 416. Indeed, the character recognition enhancement system 102 utilizes the edge based adaptive binarization model 408 to analyze the digital image 416 to determine or detect the atypically-sized text region 418 and the atypically-sized text glyphs 420.

For example, the character recognition enhancement system 102 determines a size of text glyphs and compares the size against a maximum size threshold (e.g., a threshold that, when exceeded, indicates large glyphs) and/or a minimum size threshold (e.g., a threshold that, when below, indicates small glyphs). Based on the comparison, the character recognition enhancement system 102 determines whether text glyphs are atypically-sized. Thus, the character recognition enhancement system 102 identifies the atypically-sized text glyphs 420 as glyphs that exceed the maximum size threshold. While FIG. 4B illustrates generating bounding boxes for text glyphs larger than the maximum size threshold, in some embodiments, the character recognition enhancement system 102 generates bounding boxes for small text glyphs as well (or in the alternative).

In some embodiments, the character recognition enhancement system 102 determines (e.g., via the edge based adaptive binarization model 408) a width and a height of each text glyph within a text region (or all text regions). For instance, the character recognition enhancement system 102 determines a width and a height of each glyph within the atypically-sized text region 418. In addition, the character recognition enhancement system 102 compares the width of each glyph against one or more width thresholds (e.g., a lower width threshold that, when below, indicates a narrow glyph and an upper width threshold that, when exceeded, indicates a wide glyph). In some cases, the character recognition enhancement system 102 further compares the height of a glyph against one or more height thresholds (e.g., a lower height threshold that, when below, indicates a short glyph and an upper height threshold that, when exceeded, indicates a tall glyph).

In one or more embodiments, the character recognition enhancement system 102 determines the maximum size threshold and/or the minimum size threshold as combinations of width thresholds and height thresholds. For example, the character recognition enhancement system 102 determines a minimum size threshold as a combination of a lower width threshold and a lower height threshold. Thus, the character recognition enhancement system 102 determines a small text glyph (e.g., a first type of atypically-sized text glyph) upon determining that the glyph is narrower than the lower width threshold and shorter than the lower height threshold. As another example, the character recognition enhancement system 102 determines the maximum size threshold as a combination of an upper width threshold and an upper height threshold. Thus, in some cases, the character recognition enhancement system 102 determines a large glyph (e.g., a second type of atypically-sized text glyph) upon determining that the width of the glyph exceeds the upper width threshold and the height of the glyph exceeds the upper height threshold.

In one or more embodiments, to identify atypically-sized text glyphs 420, the character recognition enhancement system 102 filters out normally sized text glyphs identified within the digital image 416. In particular, the character recognition enhancement system 102 filters out, or removes from consideration, glyphs with sizes between a minimum size threshold and a maximum size threshold. Thus, the character recognition enhancement system 102 selects glyphs beyond extremes of the two thresholds as atypically-sized text glyphs.

As shown, the character recognition enhancement system 102 further generates bounding boxes to surround or indicate each of the atypically-sized text glyphs 424. Indeed, based on determining glyphs dimensions (e.g., widths and heights) and comparing the dimensions against thresholds, the character recognition enhancement system 102 generates bounding boxes to designate the atypically-sized text glyphs 424 (e.g., via the edge based adaptive binarization model 408). Additionally, the character recognition enhancement system 102 generates the modified digital image 422 depicting the bounding boxes. Indeed, the character recognition enhancement system 102 generates the modified digital image 422 that includes the atypically-sized text glyphs 424 indicated as large text that exceeds the maximum size threshold within bounding boxes.

Figure 5A:
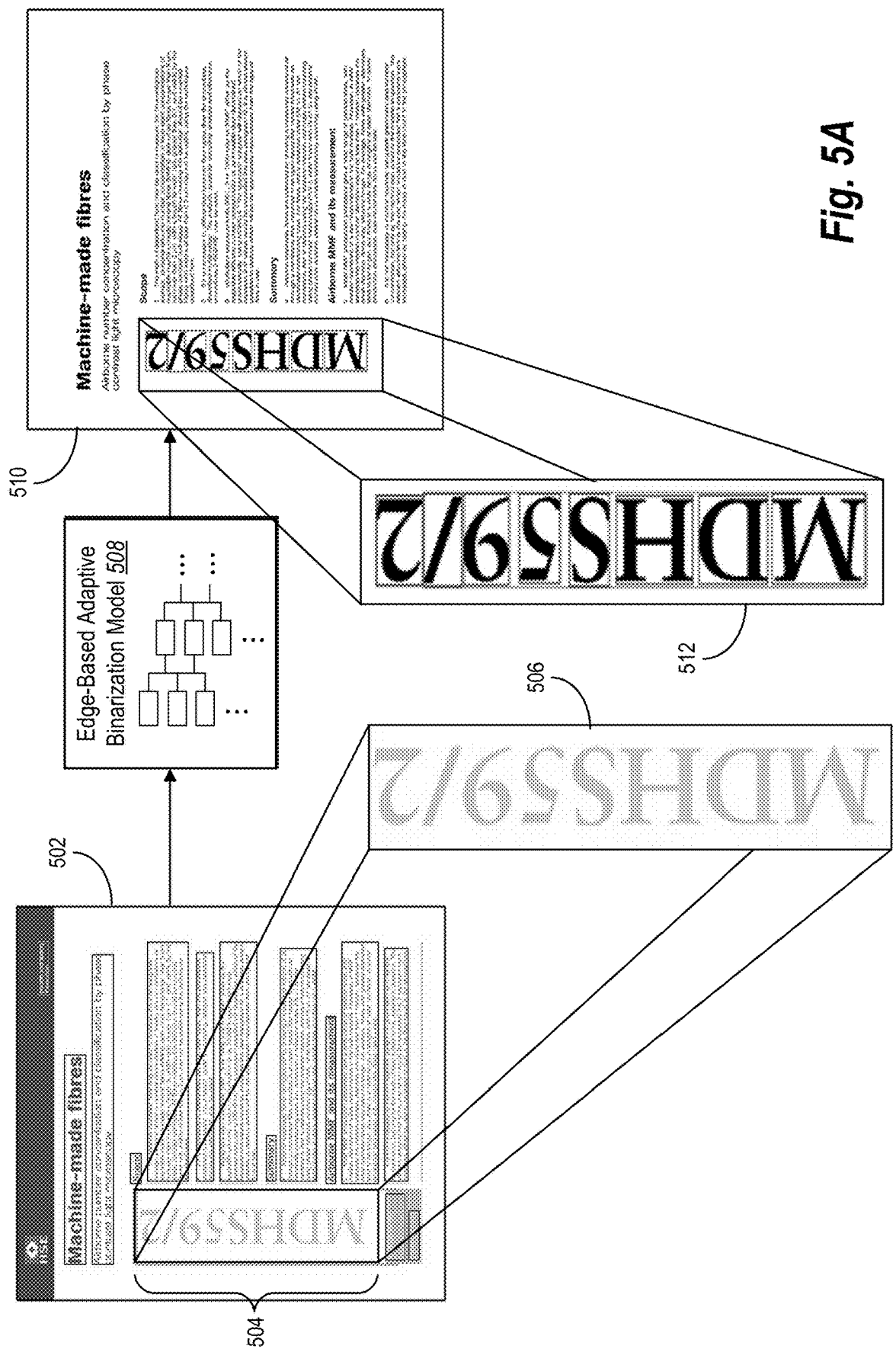
FIGS. 5A-5B illustrate examples of determining vertical text from a digital image in accordance with one or more embodiments.
Figure 5B:
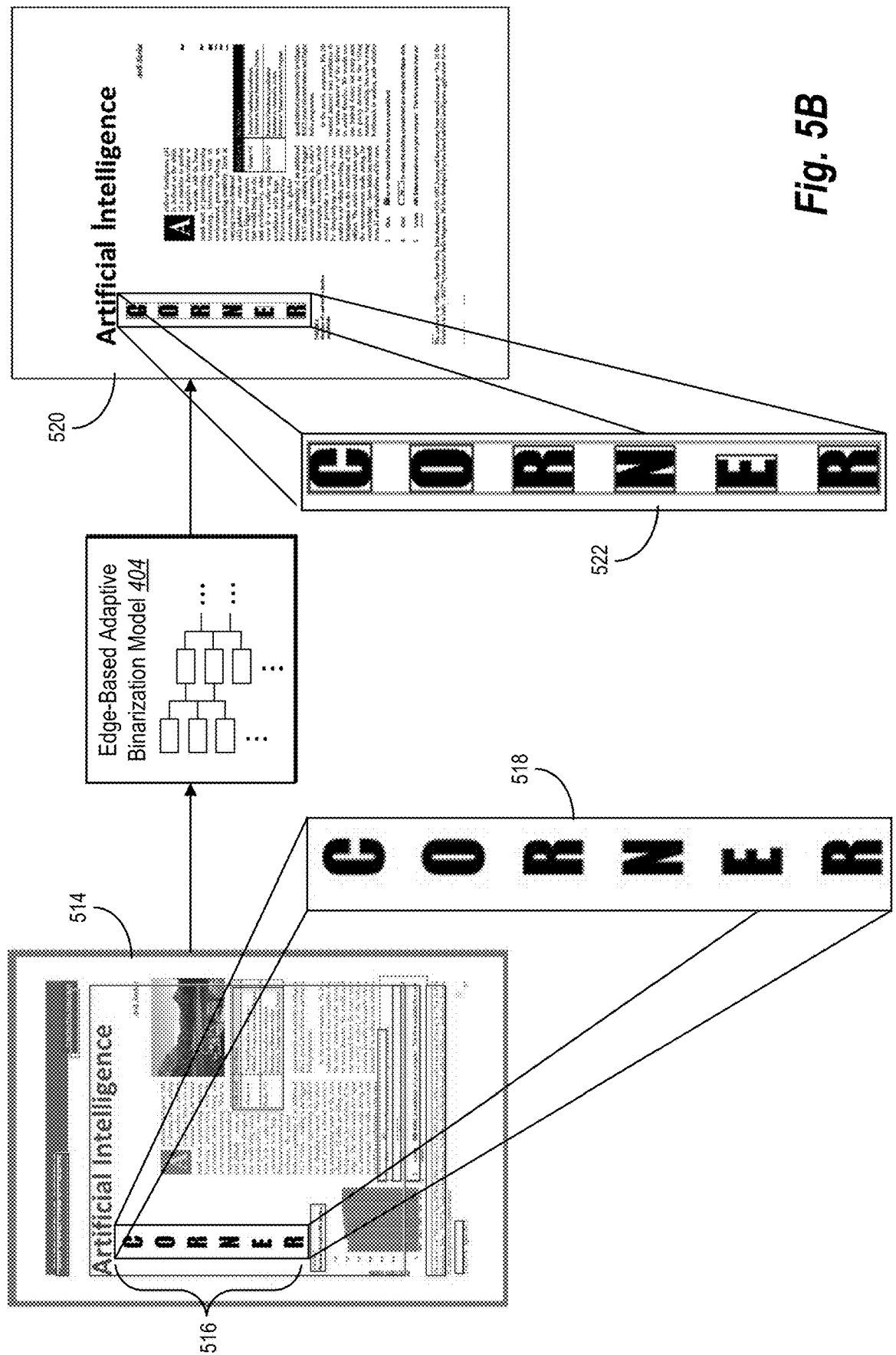

As mentioned, in certain embodiments, the character recognition enhancement system 102 generates bounding boxes for vertical text glyphs. In particular, the character recognition enhancement system 102 generates bounding boxes for upright vertical text glyphs (e.g., vertical text glyphs with no rotation) and/or for sideways vertical text glyphs (e.g., vertically arranged text glyphs that have been rotated). FIGS. 5A-5B illustrate examples for generating bounding boxes for vertical text glyphs in accordance with one or more embodiments.

As illustrated in FIG. 5A, the character recognition enhancement system 102 generates a modified digital image 510 depicting vertical text glyphs 512 with corresponding bounding boxes. In particular, the character recognition enhancement system 102 generates the modified digital image 510 from the digital image 502. Indeed, the character recognition enhancement system 102 generates the modified digital image 510 utilizing the edge based adaptive binarization model 508 (e.g., the edge based adaptive binarization model 408) to analyze or process the digital image 502. To elaborate, the character recognition enhancement system 102 determines or detects, via the edge based adaptive binarization model 508, a vertical text region 504 within the digital image 502 that depicts vertical text glyphs 506. As shown, the vertical text region 504 depicts vertical text glyphs 506 that are sideways or that are rotated ninety degrees from an upright orientation.

In some embodiments, the character recognition enhancement system 102 identifies the vertical text region 504 by generating a dilated digital image. More specifically, the character recognition enhancement system 102 generates a dilated version of the digital image 502 by dilating, or stretching or elongating, the digital image 502 in a horizontal (e.g., x-axis) direction. Indeed, the character recognition enhancement system 102 utilizes the edge based adaptive binarization model 508 to modify the digital image 502 by dilating along the horizontal direction, including depicted text and corresponding bounding boxes. In certain implementations, the character recognition enhancement system 102 dilates the digital image 502 by a certain distance or percentage (e.g., a certain percentage of a width of the digital image 502).

In certain implementations, the character recognition enhancement system 102 determines, detects, or identifies the vertical text region 504 based on the dilation. In particular, by dilating horizontally in this fashion, the character recognition enhancement system 102 amplifies or emphasizes differences (in horizontal width) between horizontally arranged glyph sets and vertically arranged glyph sets. Indeed, based on the dilation, the character recognition enhancement system 102 determines or identifies glyphs or glyph sets that are orientated horizontally with respect to the digital image 502. Similarly, the character recognition enhancement system 102 also determines or identifies glyphs or glyph sets that are orientated vertically with respect to the digital image 502.

In some embodiments, to identify the vertical text glyphs 506 of the vertical text region 504, the character recognition enhancement system 102 generates bounding boxes for glyphs within the dilated digital images. The character recognition enhancement system 102 further sorts the bounding boxes in a top-down fashion to determine which bounding boxes appear above or below other bounding boxes within the digital image 502. In addition, the character recognition enhancement system 102 filters out bounding boxes that are horizontally orientated (or not vertically orientated) with respect to the digital image 502 (or the dilated digital image). For example, the character recognition enhancement system 102 utilizes a dilation filter (e.g., a block filter of a particular size such as 5×5 pixels) to filter out bounding boxes (or glyphs) that are not vertically aligned with a previous bounding box within the sorting. Indeed, the character recognition enhancement system 102 compares an orientation of a given glyph (or its given bounding box) with that of a previous glyph (or corresponding bounding box) within the sorting.

In some implementations, the character recognition enhancement system 102 further filters bounding boxes based on dimensions of the bounding boxes. In particular, the character recognition enhancement system 102 determines widths and heights of each bounding box (within the digital image 502 or within the dilated digital image). In addition, the character recognition enhancement system 102 filters out bounding boxes with widths and/or heights that exceed a width threshold and/or a height threshold. Indeed, in some cases, the character recognition enhancement system 102 filters bounding boxes based on dimensions and further based on orientation within the digital image 502 (or within the dilated digital image).

Based on filtering out horizontal text glyphs, the character recognition enhancement system 102 identifies the vertical text glyphs 506. In addition, the character recognition enhancement system 102 generates bounding boxes to indicate vertical text glyphs. For example, the character recognition enhancement system 102 generates the modified digital image 510 that depicts vertical text glyphs 512 within corresponding bounding boxes. In some cases, the character recognition enhancement system 102 utilize the edge based adaptive binarization model 508 to generate the bounding boxes within the modified digital image 510.

As mentioned above, in certain described embodiments, the character recognition enhancement system 102 identifies upright vertical text and sideways vertical text. FIG. 5A illustrates an example of sideways vertical text. Conversely, FIG. 5B illustrates an example of upright vertical text in accordance with one or more embodiments.

As illustrated in FIG. 5B, the character recognition enhancement system 102 identifies or detects the vertical text region 516 including the vertical text glyphs 518. Comparing to FIG. 5A, the vertical text glyphs 518 are upright in that they do have any rotation and are read in a top-down fashion as portrayed. Other than the orientation of the vertical text glyphs 518, the process of generating the modified digital image 520 is the same as described above in relation to FIG. 5A.

To reiterate, the character recognition enhancement system 102 utilizes the edge based adaptive binarization model 508 to determine the vertical text glyphs 518 within the vertical text region 516. Indeed, as described above in relation to FIG. 5A, the character recognition enhancement system 102 identifies the vertical text glyphs 518 by dilating the digital image 514, generating bounding boxes for the glyphs within the dilated digital image, sorting the bounding boxes in a top-down fashion, and filtering out bounding boxes that are not vertically aligned in relation to a previous bounding box (and/or with heights/widths that exceed respective thresholds) or with respect to the dilated digital image (or the digital image 514).

In addition, and as described above, the character recognition enhancement system 102 generates the modified digital image 520 depicting the vertical text glyphs 522 within respective bounding boxes. Indeed, the character recognition enhancement system 102 generates bounding boxes for the vertical text glyphs utilizing the edge based adaptive binarization model 508.

Figure 6:
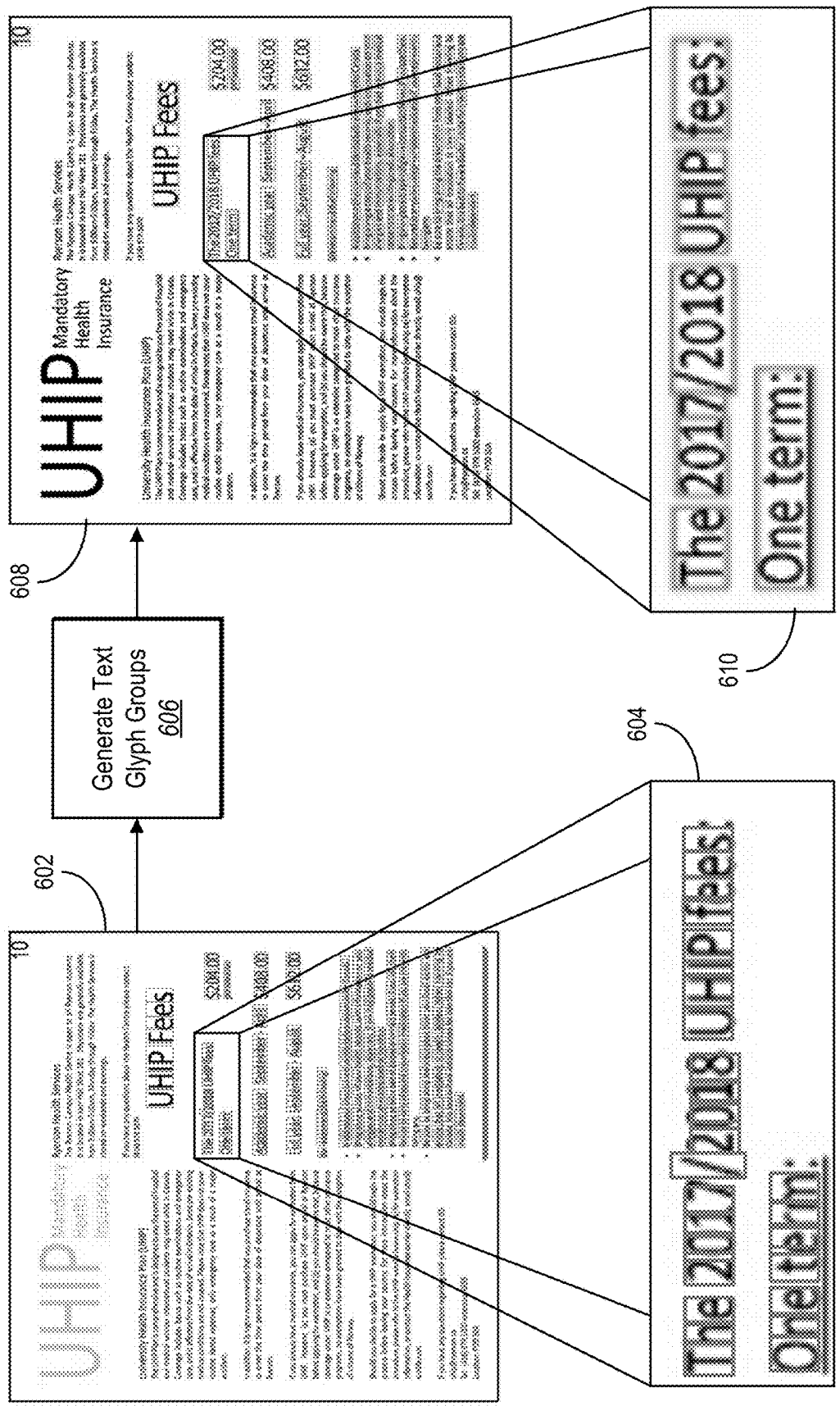
FIG. 6 illustrates an example of generating and combining bounding boxes for text glyphs in accordance with one or more embodiments.

As mentioned above, in certain described embodiments, the character recognition enhancement system 102 generates groups of glyphs from a digital image. In particular, the character recognition enhancement system 102 generates glyph groups by combining bounding boxes for individual text glyphs into combined bounding boxes indicating sets of glyphs. Indeed, the character recognition enhancement system 102 generates text glyph groups for reverse text, vertical text, and/or atypically-sized text to combined bounding boxes and generate digital images fit for optical character recognition. FIG. 6 illustrates an example of generating glyph groups from glyphs of a digital image in accordance with one or more embodiments.

As illustrated in FIG. 6, the character recognition enhancement system 102 the character recognition enhancement system 102 performs an act 606 to generate text glyph groups from the digital image 602. In particular, the character recognition enhancement system 102 generates text glyph groups by combining bounding boxes associated with individual text glyphs (which are generated as described above in relation to FIGS. 4A-5B). Thus, the character recognition enhancement system 102 generates a modified digital image (e.g., the modified digital image 608) that includes combined bounding boxes (rather that individual granular bounding boxes) fit for optical character recognition. In one or more embodiments, the character recognition enhancement system 102 repeats the process of generating text glyph groups for reverse text glyphs, vertical text glyphs, and/or atypically-sized text glyphs.

In one or more embodiments, the character recognition enhancement system 102 determines bounding boxes for individual inverted text glyphs 604 (as described above). In addition, the character recognition enhancement system 102 combines bounding boxes to generate combined bounding boxes. For instance, the character recognition enhancement system 102 determines glyphs or bounding boxes along a common line with a digital image (or within a reverse text region or an inverted text region) and combines the bounding boxes together.

In some cases, the character recognition enhancement system 102 combines bounding boxes based on horizontal distances from other bounding boxes (or glyphs). To elaborate, the character recognition enhancement system 102 determines horizontal distances between individual bounding boxes (e.g., within the inverted text glyphs 604) and compares the horizontal distances to a threshold horizontal distance. Upon determining that a horizontal distance between two (adjacent) bounding boxes is within the threshold horizontal distance, the character recognition enhancement system 102 combines the bounding boxes. In some implementations, the character recognition enhancement system 102 determines the threshold horizontal distance based on an average height of text glyphs (or bounding boxes) within a given text line, within a number of text lines, within one or more text regions of a digital image (e.g., the digital image 602), or across the entire digital image.

In some embodiments, the character recognition enhancement system 102 utilizes other factors in addition, or in the alternative, to horizontal distance. For example, the character recognition enhancement system 102 combines bounding boxes based on identifying list labels (e.g., demarcated by bullet points or other special list markers), determining whether a text glyph (or word) is at the beginning of a text line, comparing relative heights between text glyphs (or bounding boxes) to be joined to determine whether the difference between heights satisfies a ratio threshold, and/or determining relative positions of text glyphs (or bounding boxes) to be joined (e.g., to determine superscripts or subscripts). Based on one or more of the aforementioned factors, the character recognition enhancement system 102 combines bounding boxes of individual text glyphs into words or text lines.

In addition, the character recognition enhancement system 102 further merges the combined bounding box with one or more additional combined bounding boxes to form a text glyph group such as the inverted text glyph group 610. As shown, the inverted text glyph group 610 includes multiple combined bounding boxes indicating individual words. In some cases, the character recognition enhancement system 102 merges combined bounding boxes based on vertical distances between combined bounding boxes (e.g., on different lines within the digital image 602). More specifically, the character recognition enhancement system 102 determines a vertical distance between one combined bounding box (e.g., representing one text line) and another combined bounding box (e.g., representing another text line). Upon determining that the vertical distance is within a vertical distance threshold, the character recognition enhancement system 102 merges the combined bounding boxes.

In one or more implementations, the character recognition enhancement system 102 determines one or more additional (or alternative) factors for merging combined bounding boxes. For example, the digital content editing system 106 and/or the character recognition enhancement system 102 determines whether a combined bounding box is a list label, a list item, or a drop cap (e.g., large initial letter). As additional examples, the character recognition enhancement system 102 determines whether a combined text box is part of a table of contents, determines whether the combined text box is part of an open table, compares a height of the combined bounding box with a height of another combined bounding box to be merged (e.g., to determine if the difference in heights satisfies a threshold height difference), and/or compares a horizontal span of a combined bounding box with another combined bounding box to be merged. Based on one or more of the aforementioned factors, the character recognition enhancement system 102 merges combined bounding boxes into text glyph groups that span one or more text lines within a digital image.

In certain cases, to generate and merge combined bounding boxes for text glyph groups, the character recognition enhancement system 102 utilizes the methods and systems described in U.S. Pat. No. 9,223,756, entitled "Method and Apparatus for Identifying Logical Blocks of Text in a Document," which is incorporated herein by reference in its entirety. Indeed, in some embodiments, the character recognition enhancement system 102 generates combined bounding boxes that represent words or text lines (as described in U.S. Pat. No. 9,223,756) within a digital image and further generates text glyph groups that represent text blocks or paragraphs (as described in U.S. Pat. No. 9,223,756) within a digital image.

For reverse text glyphs (e.g., as described in relation to FIG. 4A), for example, the character recognition enhancement system 102 generates an inverted text glyph group. As shown in FIG. 6, the character recognition enhancement system 102 generates a modified digital image 608 from the digital image 602. To elaborate, the character recognition enhancement system 102 generates an inverted text glyph group 610 (as part of or indicating an entire inverted text region) from inverted text glyphs 604 by generating and merging combined bounding boxes based on the above factors. Indeed, the character recognition enhancement system 102 generates the inverted text glyph group 610 to indicate words, sentences, or other groups of glyphs for optical character recognition.

While the illustration of FIG. 6 relates primarily to generating an inverted text glyph group 610 from reverse text glyphs, the same process applies to generating text glyph groups for atypically-sized text groups and for vertical text glyph groups. For atypically-sized text glyphs (e.g., as described in relation to FIG. 4B), for instance, the character recognition enhancement system 102 generates a vertical text glyph group by determining bounding boxes for vertical text glyphs, combining bounding boxes into combined bounding boxes, and merging combined bounding boxes into a vertical text glyph group according to the criteria described above.

For vertical text glyphs (e.g., as described in relation to FIGS. 5A-5B), the character recognition enhancement system generates an atypically-sized text glyph group. To elaborate, the character recognition enhancement system 102 determines bounding boxes for individual atypically-sized text glyphs and combines bounding boxes into combined bounding boxes based on the factors described above. In addition, the character recognition enhancement system 102 merges combined bounding boxes into atypically-sized text glyph groups based on the aforementioned merging criteria.

As mentioned above, in certain described embodiments, the character recognition enhancement system 102 generates a resized text digital image from atypically-sized text of a digital image. In particular, the character recognition enhancement system 102 extracts atypically-sized text glyphs from a digital image, resizes the glyphs to a size recognizable by an optical character recognition model, and generates a resized text digital image for analysis by the optical character recognition model. FIG. 7 illustrates an example of generating a resized text digital image in accordance with one or more embodiments.

As illustrated in FIG. 7, the character recognition enhancement system 102 identifies or determines the atypically-sized text glyphs 704 within the digital image 702 in accordance with this description. For example, the character recognition enhancement system 102 identifies text glyphs with sizes that exceed a maximum size threshold (or that are smaller than a minimum size threshold) utilizing an edge based adaptive binarization model. In addition, the character recognition enhancement system 102 generates, combines, and merges bounding boxes for text glyphs as described above. In some cases, the character recognition enhancement system 102 determines parent-child relationships between text lines (or words or groups) and individual text glyphs. For instance, the character recognition enhancement system 102 determines individual bounding boxes within combined bounding boxes and/or text glyph groups. The character recognition enhancement system 102 further extracts the parent bounding box (e.g., a combined bounding box or a text glyph group) that includes bounding boxes for all of the individual atypically-sized text glyphs 704. In some cases, the character recognition enhancement system 102 whites out, removes, or erases the pixels of the atypically-sized text glyphs 704 from the digital image 702.

Further, the character recognition enhancement system 102 performs an act 706 to generate a resized text digital image 708. In particular, the character recognition enhancement system 102 generates the resized text digital image 708 from the digital image 702. For instance, the character recognition enhancement system 102 resizes the atypically-sized text glyphs 704 to generate the resized text glyphs 710. Indeed, the character recognition enhancement system 102 resizes the atypically-sized text glyphs 704 to a size that is recognizable by an optical character recognition model. In some cases, the character recognition enhancement system 102 generates the resized text digital image 708 to include (only) the resized text glyphs 710 and to exclude any other glyphs and graphical content.

Figure 8A:
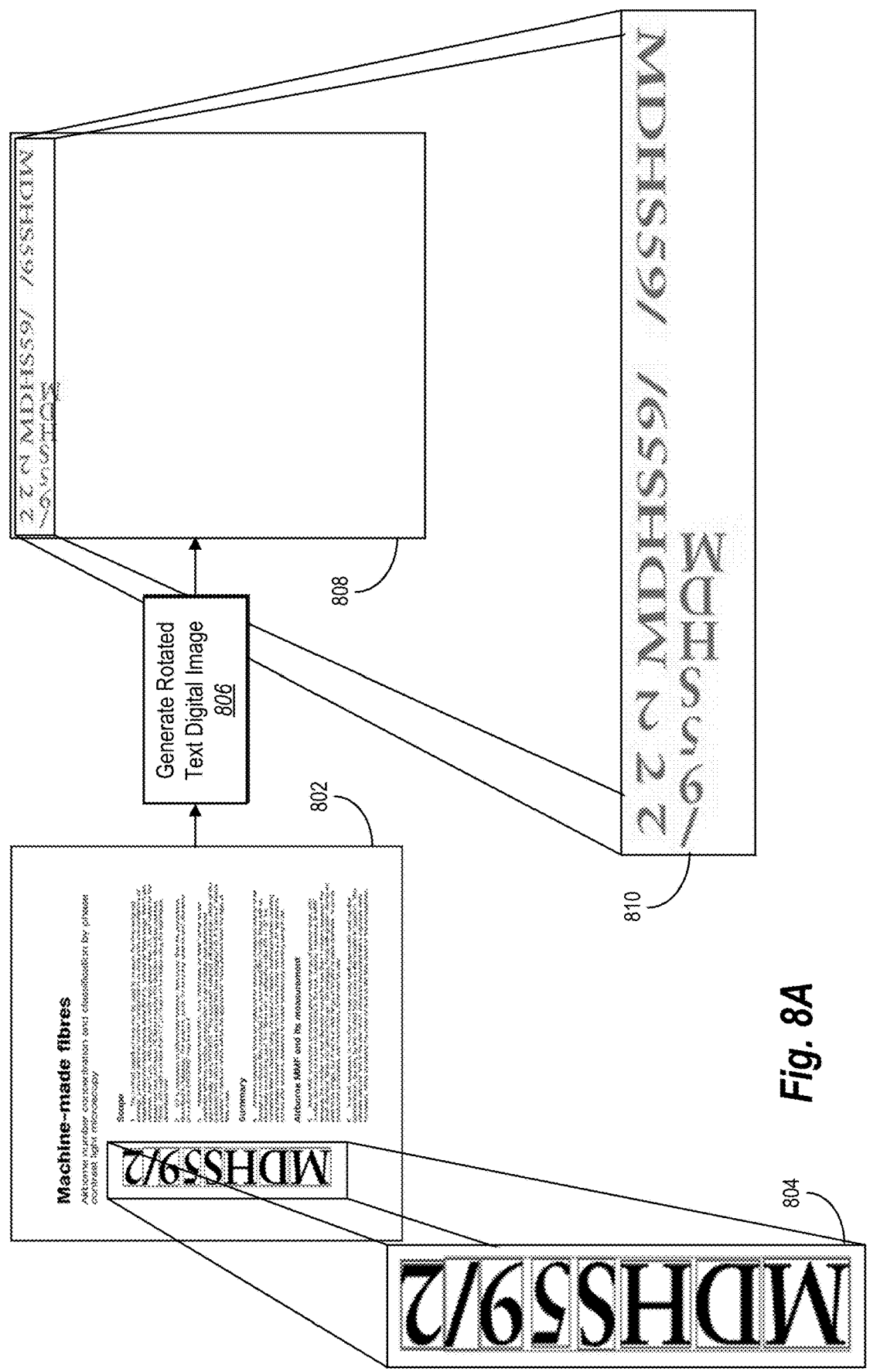
FIGS. 8A-8B illustrate examples of generating rotated text digital images in accordance with one or more embodiments.
Figure 8B:
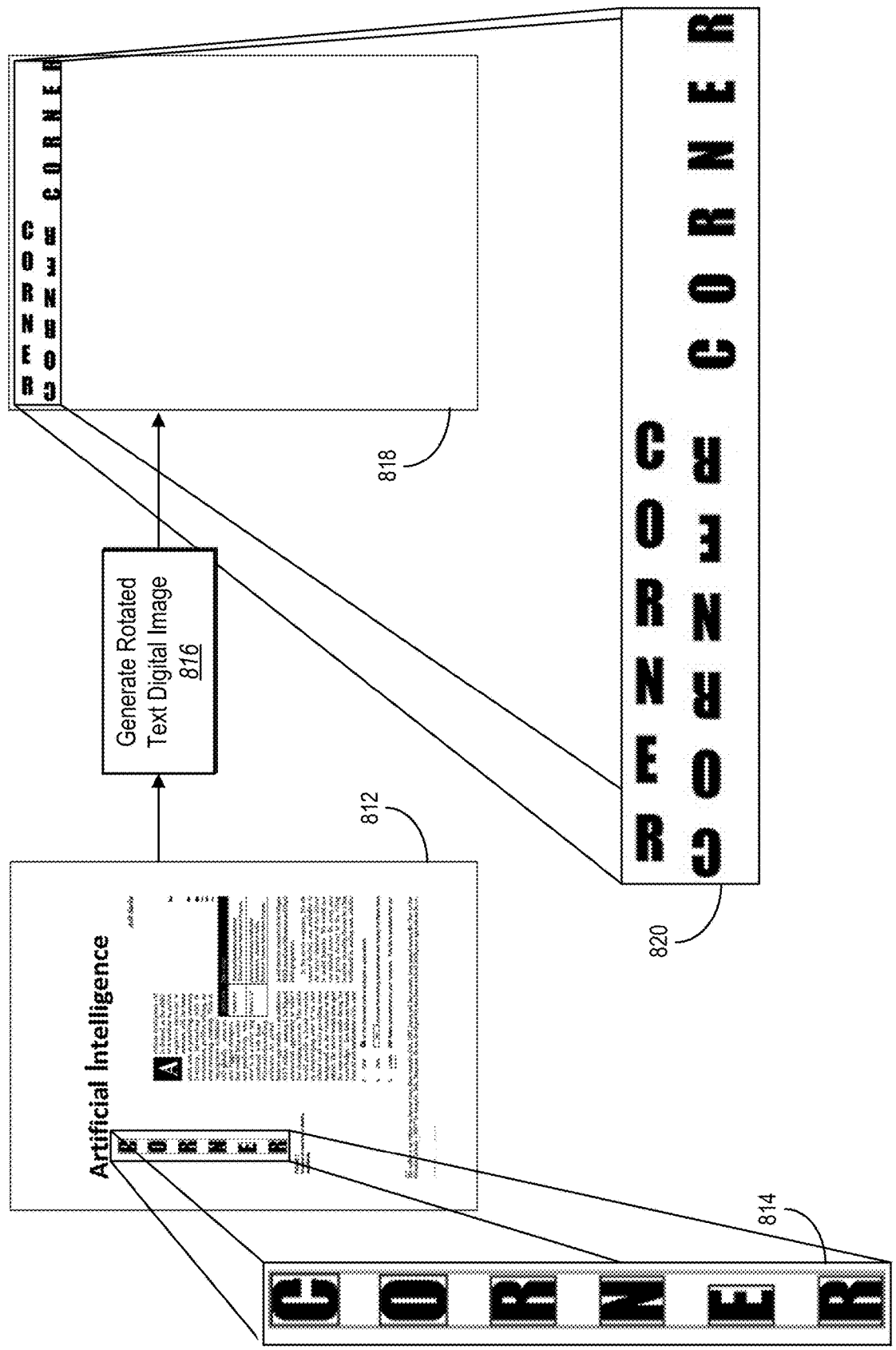

As mentioned above, in one or more embodiments, the character recognition enhancement system 102 generates rotated text digital images. In particular, the character recognition enhancement system 102 identifies vertical text within a digital image, rotates the text within the digital image, and generates a rotated text digital image recognizable by an optical character recognition model. FIGS. 8A-8B illustrate examples for generating rotated text digital images in accordance with one or more embodiments. Indeed, FIG. 8A illustrates generating a rotated text digital from sideways vertical text glyphs. Thereafter, FIG. 8B illustrates generating a rotated text glyph from upright vertical text glyphs.

As illustrated in FIG. 8A, the character recognition enhancement system 102 identifies or determines vertical text glyphs 804 within the digital image 802. In particular, the character recognition enhancement system 102 analyzes the digital image 802 via the edge based adaptive binarization model to identify the sideways vertical text glyphs 804 based on dilating the digital image 802, comparing dimensions of dilated glyphs (or bounding boxes), and identifying text glyphs that are orientated vertically within the digital image 802. In some cases, the character recognition enhancement system 102 determines parent-child relationships between bounding boxes and combined bounding boxes (and/or text glyph groups) for the vertical text glyphs 804. The character recognition enhancement system 102 further extracts the vertical text glyphs 804 within the parent bounding box and whites out the corresponding pixels of the digital image 802.

In addition, the character recognition enhancement system 102 performs an act 806 to generate a rotated text digital image 808 from the digital image 802. Specifically, the character recognition enhancement system 102 generates the rotated text digital image 808 from the vertical text glyphs 804. For instance, the character recognition enhancement system 102 rotates the vertical text glyphs 804 and generates the rotated text digital image 808 to include (only) rotated text 810, excluding other text and graphics.

In some cases, the character recognition enhancement system 102 generates multiple rotated versions of the vertical text glyphs 804 to include within the rotated text digital image 808. For example, the character recognition enhancement system 102 generates three rotated versions of the vertical text glyphs 804, rotating the glyphs ninety degrees for one version, two hundred seventy degrees for another version, and rotating the glyphs to appear horizontal and upright for the third version. As shown, the character recognition enhancement system 102 identifies two separate vertical text glyph groups within the vertical text glyphs 804 (e.g., due to the slash indicating a separation between groups), one that includes "MDHS59/" and another that includes "2." Thus, the character recognition enhancement system 102 generates the rotated text 810 to include three versions of the "MDHS59/" and three versions of the "2," rotated as described above. In some embodiments, the character recognition enhancement system 102 generates more or fewer versions of rotated text for a rotated text digital image, where the different rotations can also vary in magnitudes or amounts.

As illustrated in FIG. 8B, the character recognition enhancement system 102 generates a rotated text digital image 818 from the digital image 812. Indeed, the character recognition enhancement system 102 identifies or receives the digital image 812 and analyzes the digital image 812 via an edge based adaptive binarization model to determine or identify the upright vertical text glyphs 814. In addition, the character recognition enhancement system 102 performs an act 816 to generate a rotated text digital image 818 from the upright vertical text glyphs 814.

As described above in relation to FIG. 8A, the character recognition enhancement system 102 generates rotated text 820 from the upright vertical text glyphs 814. In some embodiments, the character recognition enhancement system 102 generates multiple rotated versions of rotated text to include within the rotated text digital image 818. For instance, the character recognition enhancement system 102 rotates the upright vertical text glyphs 814 ninety degrees for one version, two hundred seventy degrees for another version, and arranges the glyphs upright and horizontal for yet another version. As shown, the character recognition enhancement system 102 generates the rotated text digital image 818 with three versions of rotated text as described.

Figure 9A:
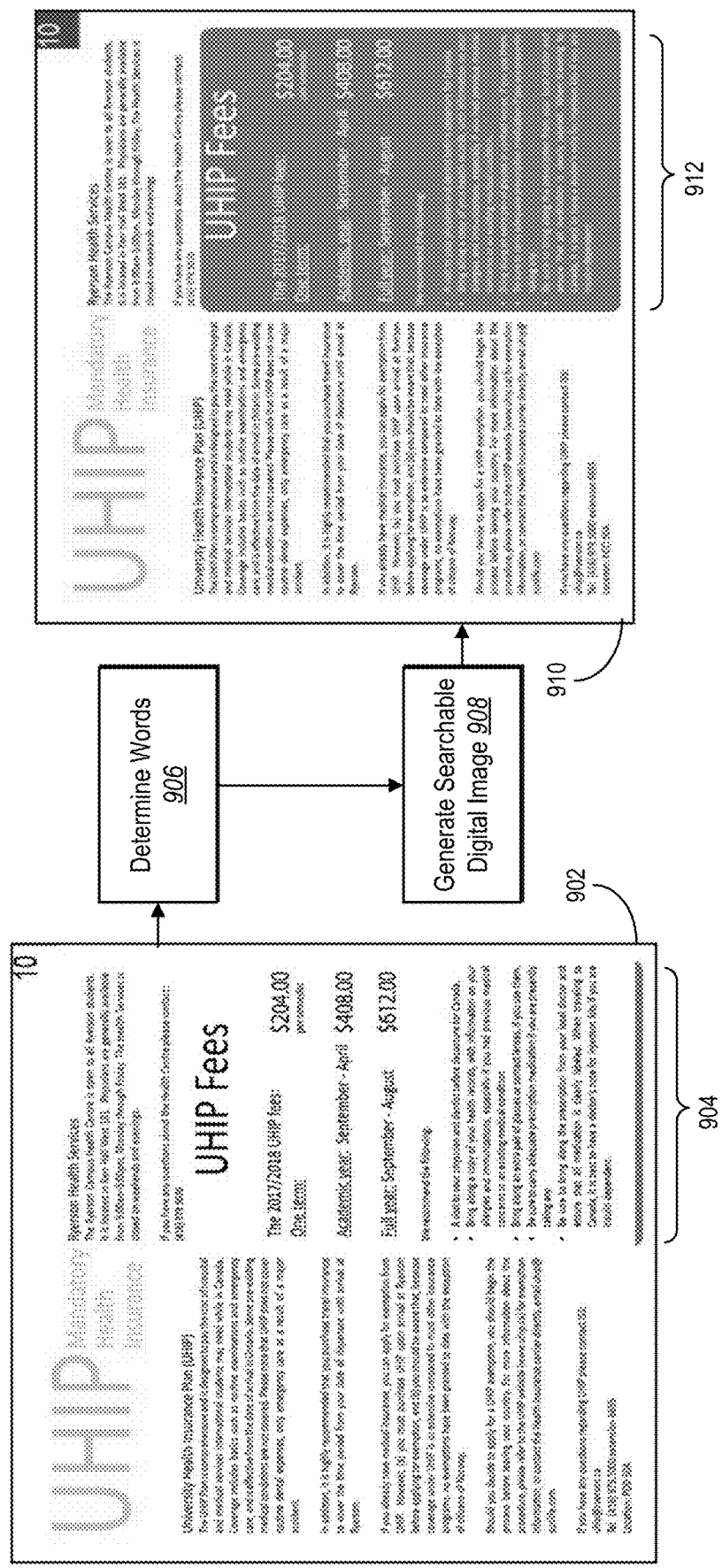
FIGS. 9A-9C illustrate examples of generating searchable digital images in accordance with one or more embodiments.
Figure 9B:
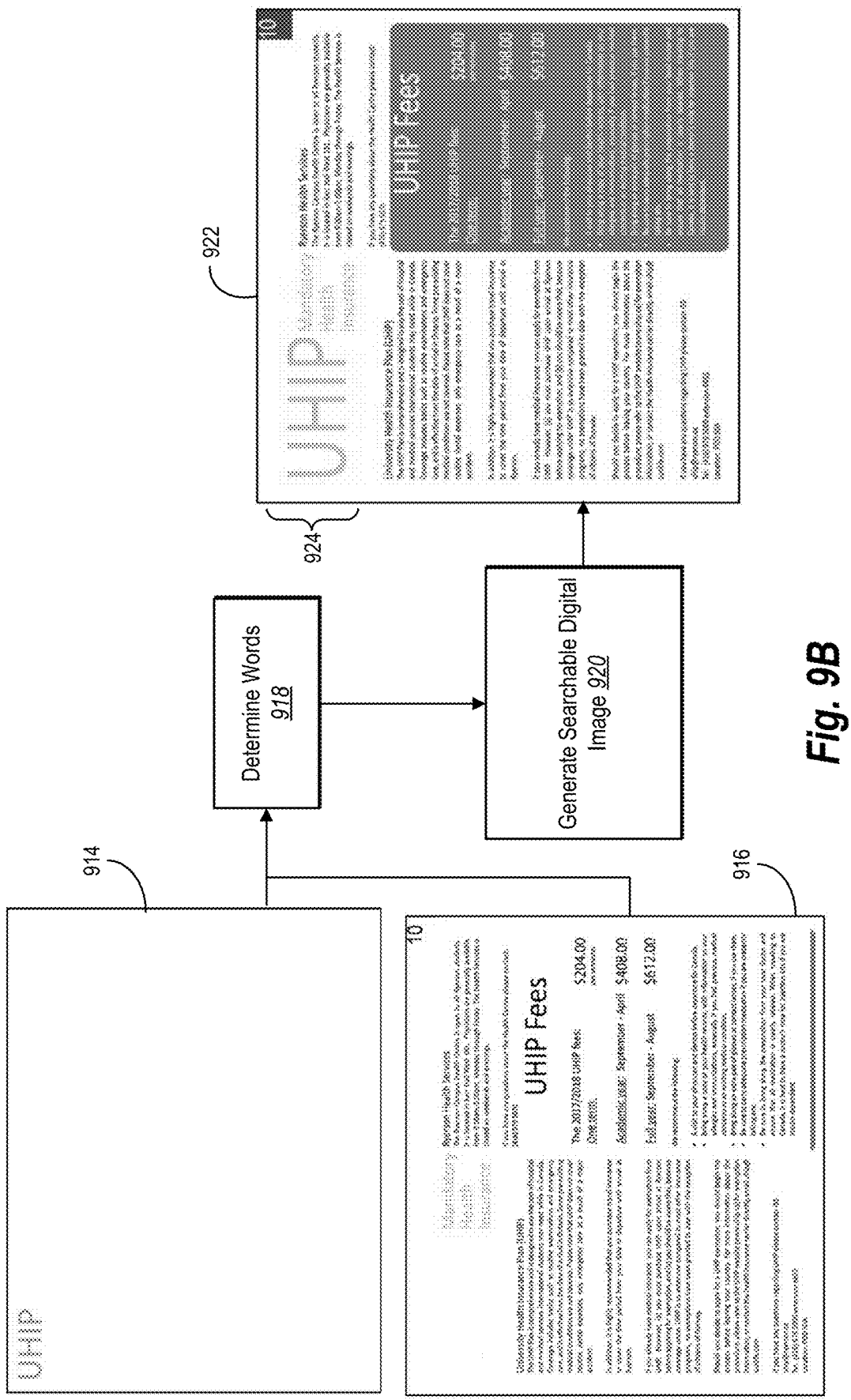
Figure 9C:
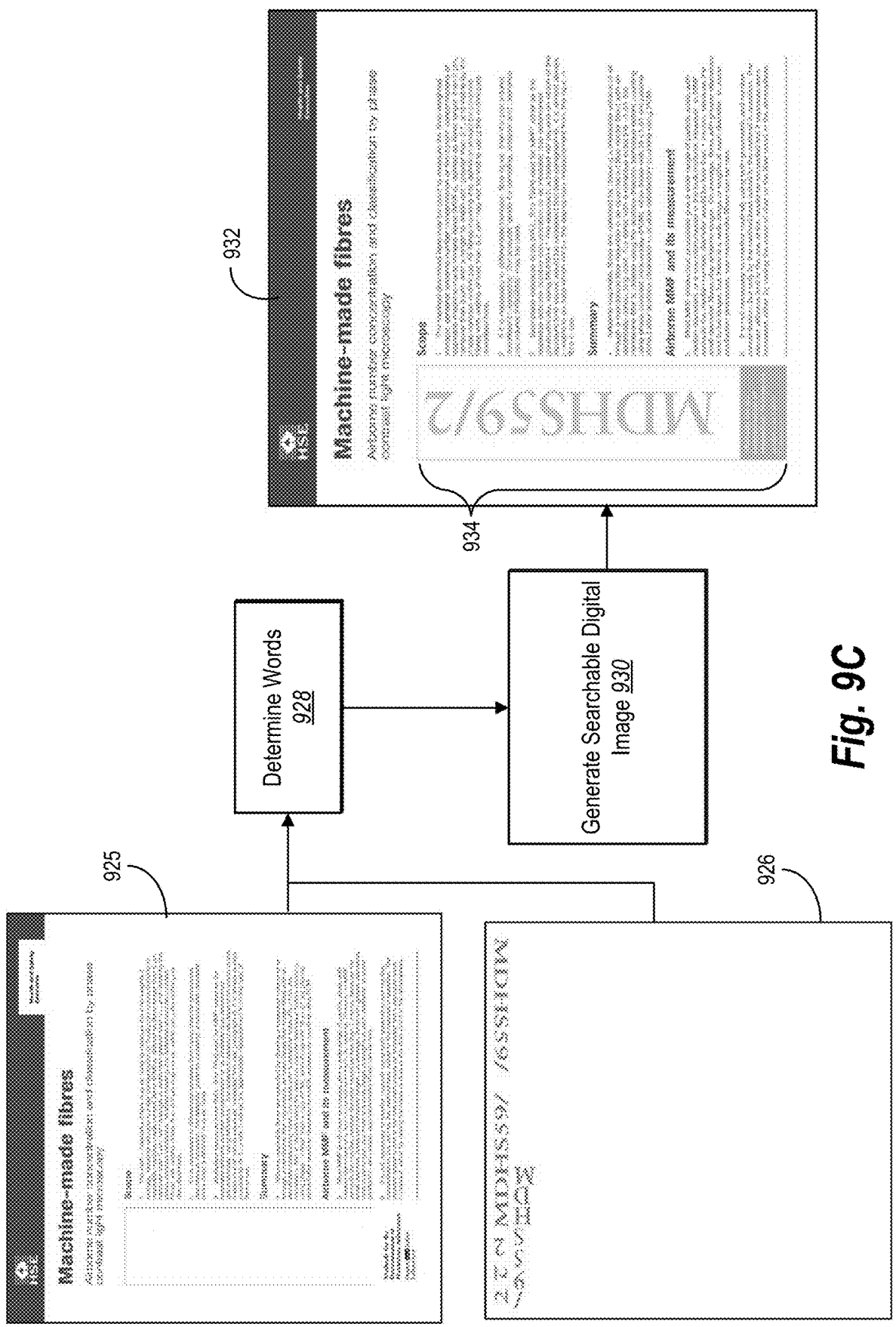

As mentioned above, in certain embodiments, the character recognition enhancement system 102 generates a searchable digital image from a digital image including reverse text glyphs, vertical text glyphs, and/or atypically-sized text glyphs. In particular, the character recognition enhancement system 102 generates a searchable digital image with text glyphs that are searchable and/or selectable, including reveres text glyphs, vertical text glyphs, and/or atypically-sized text glyphs. FIGS. 9A-9C illustrate examples of generating searchable digital images in accordance with one or more embodiments. FIG. 9A illustrates generating a searchable digital image from reverse text glyphs. FIG. 9B illustrates generating a searchable digital image from atypically-sized text glyphs. FIG. 9C illustrates generating a searchable digital image from vertical text glyphs.

As illustrated in FIG. 9A, the character recognition enhancement system 102 generates the searchable digital image 910 including a reverse text region 912. Indeed, the character recognition enhancement system 102 generates the searchable digital image 910 for display on the client device 108, whereupon the client device 108 receives user interaction to search for and select digital text within the searchable digital image 910. To generate the searchable digital image 910, the character recognition enhancement system 102 identifies or generates the modified digital image 902 that includes text regions including the inverted text region 904.

Indeed, as described above, the character recognition enhancement system 102 generates the inverted text region 904 from a reverse text region of an initial input digital image. In addition, the character recognition enhancement system 102 combines the inverted text region 904 within other text regions to generate the digital image 902. Additionally, the character recognition enhancement system 102 performs the act 906 to determine words within the modified digital image 902. Specifically, the character recognition enhancement system 102 utilizes an optical character recognition model to determine words within the modified digital image 902 that includes inverted text and normal text. In some embodiments, the character recognition enhancement system 102 determines words within the inverted text region 904 separately from other text of the modified digital image 902 (e.g., within an independent inverted text digital image).

Based on determining words within the modified digital image 902 (including the inverted text region 904), the character recognition enhancement system 102 further performs an act 908 to generate the searchable digital image 910. In particular, the character recognition enhancement system 102 generates the searchable digital image 910 to visibly resemble the initial digital image, but to include text glyphs that are selectable and searchable. Indeed, the character recognition enhancement system 102 replaces the inverted text region 904 (or the representation of the inverted text region 904) with the reverse text region 912 (or a representation of the reverse text region 912), while maintaining the searchable/selectable traits of the text glyphs of the inverted text region.

As illustrated in FIG. 9B, the character recognition enhancement system 102 generates a selectable digital image 922 from a resized text digital image 914 and a modified digital image 916. In particular, the character recognition enhancement system 102 generates the resized text digital image 914 as described above. In addition, the character recognition enhancement system 102 generates the modified digital image 916 by extracting the atypically-sized text glyphs and whiting out the corresponding pixels.

As shown, the character recognition enhancement system 102 further performs an act 918 to determine words from the resized text digital image 914 and the modified digital image 916. Specifically, the character recognition enhancement system 102 utilizes an optical character recognition model to determine words from the resized text digital image 914 and the modified digital image 916.

In addition, the character recognition enhancement system 102 performs an act 920 to generate the searchable digital image 922. More specifically, the character recognition enhancement system 102 combines the resized text digital image 914 and the modified digital image 916. Indeed, the character recognition enhancement system 102 generates the searchable digital image 922 to include the atypically-sized text glyphs 924 that are searchable and selectable. For instance, the character recognition enhancement system 102 generates the searchable digital image 922 to resemble the initial digital image in appearance, but to include data or information indicating individual text glyphs and words determined via optical character recognition.

As illustrated in FIG. 9C, the character recognition enhancement system 102 generates the searchable digital image 932. In particular, the character recognition enhancement system 102 generates the searchable digital image 932 from the modified digital image 925 and the rotated text digital image 926. Indeed, as described, the character recognition enhancement system 102 generates the modified digital image 925 by extracting the vertical text glyphs and whiting out the corresponding pixels. As further described, the character recognition enhancement system 102 generates the rotated text digital image 926 from the extracted vertical text glyphs.

As shown, the character recognition enhancement system 102 performs an act 928 to determine words from the modified digital image 925 and the rotated text digital image 926. For example, the character recognition enhancement system 102 utilizes an optical character recognition model to determine words from the modified digital image 925 and the rotated text digital image 926. The character recognition enhancement system 102 further performs an act 930 to generate the searchable digital image 932. Specifically, the character recognition enhancement system 102 generates the searchable digital image 932 by combining the modified digital image 925 and the rotated text digital image 926. Indeed, the character recognition enhancement system 102 generates the searchable digital image 932 to resemble the initial digital image and to include searchable/selectable vertical text glyphs 934.

In relation to FIGS. 9A-9C, in one or more embodiments, the character recognition enhancement system 102 generates additional or alternative information to accompany the searchable digital image 910 and for providing to the client device 108. In particular, the character recognition enhancement system 102 extracts or determines locations (or predictions for locations) of the bounding boxes for the individual words and glyphs from the optical character recognition. In addition, the character recognition enhancement system 102 generates a data structure for each predicted bounding box. In some cases, the character recognition enhancement system 102 generates (and provides to the client device 108) the data structure including: i) a position of the bounding box within the initial digital image, ii) a position of the bounding box within the modified digital image 902, iii) and angle (e.g., in radians) at which the bounding box is rotated (e.g., for vertical text glyphs), and iv) and a type of bounding box or glyph (e.g., reverse text, vertical text, or atypically-sized text). Based on this data structure, the character recognition enhancement system 102 causes the client device 108 to present or display the searchable digital image 910 with searchable glyphs in the reverse text region 912.

Figure 10:
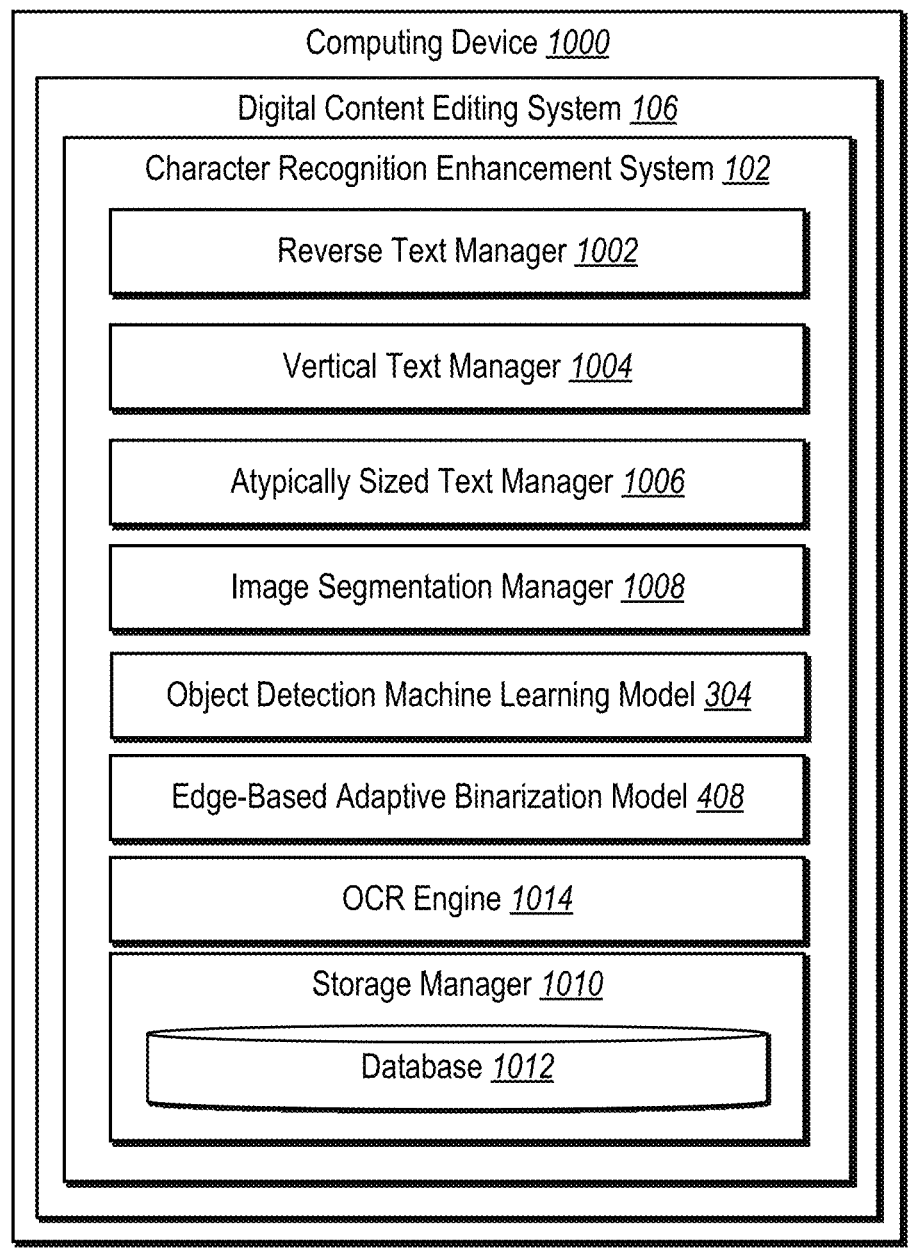
FIG. 10 illustrates a schematic diagram of a character recognition enhancement system in accordance with one or more embodiments.

Looking now to FIG. 10, additional detail will be provided regarding components and capabilities of the character recognition enhancement system 102. Specifically, FIG. 10 illustrates an example schematic diagram of the character recognition enhancement system 102 on an example computing device 1000 (e.g., one or more of the client device 108 and/or the server(s) 104). As shown in FIG. 10, the character recognition enhancement system 102 includes a reverse text manager 1002, a vertical text manager 1004, an atypically-sized text manager 1006, an image segmentation manager 1008, a storage manager 1010, the object detection machine learning model 304, the edge-based adaptive binarization model 408, and an optical character recognition (OCR) engine 1014.

As just mentioned, the character recognition enhancement system 102 includes a reverse text manager 1002. In particular, the reverse text manager 1002 manages, maintains, identifies, processes, determines, analyzes, or detects reverse text in a digital image. In addition, the reverse text manager 1002 generates and combines bounding boxes for individual text glyphs within a reverse text region in accordance with this disclosure. The reverse text manager 1002 further generates modified digital images from reverse text, determines words within modified digital images including reverse text regions, and generates searchable digital images for display on a client device.

As just mentioned, the character recognition enhancement system 102 includes a vertical text manager 1004. In particular, the vertical text manager 1004 manages, maintains, identifies, processes, determines, analyzes, or detects vertical text in a digital image. In addition, the vertical text manager 1004 generates and combines bounding boxes for individual text glyphs within a vertical text region in accordance with this disclosure. The vertical text manager 1004 further generates modified digital images and rotated text digital images from vertical text, determines words within modified digital images and rotated text digital images, and generates searchable digital images for display on a client device.

As just mentioned, the character recognition enhancement system 102 includes an atypically-sized text manager 1006. In particular, the atypically-sized text manager 1006 manages, maintains, identifies, processes, determines, analyzes, or detects atypically-sized text in a digital image. In addition, the atypically-sized text manager 1006 generates and combines bounding boxes for individual text glyphs within an atypically-sized text region in accordance with this disclosure. The atypically-sized text manager 1006 further generates modified digital images and resized text digital images from atypically-sized text, determines words within modified digital images and resized text digital images, and generates searchable digital images for display on a client device.

As further illustrated in FIG. 10, the character recognition enhancement system 102 includes an image segmentation manager 1008. In particular, the image segmentation manager 1008 determines, generates, identifies, or detects objects within digital images. For example, the image segmentation manager 1008 segments a digital image into text regions and non-text regions. The image segmentation manager 1008 further provides indications of text regions and non-text regions to other components for determining words from reverse text, vertical text, and/or atypically-sized text. For example, the image segmentation manager 1008 utilizes the object detection machine learning model 304 to detect text and non-text regions. Additionally, the image segmentation manager 1008 utilizes the edge-based adaptive binarization model 408 to extract text glyphs and their bounding boxes information from the text regions identified using the object detection machine learning model 304. In addition, the character recognition enhancement system 102 utilizes the OCR engine 1014 on auxiliary image(s) produced by the reverse, vertical, and atypically sized text managers 1002-1008 to recognize text.

The character recognition enhancement system 102 further includes a storage manager 1010. The storage manager 1010 operates in conjunction with, or includes, one or more memory devices such as the database 1012 (e.g., the database 112) that store various data such as an object detection machine learning model, an edge based adaptive binarization model, an optical character recognition model, one or more digital images, and/or one or more searchable digital images.

In one or more embodiments, each of the components of the character recognition enhancement system 102 are in communication with one another using any suitable communication technologies. Additionally, the components of the character recognition enhancement system 102 is in communication with one or more other devices including one or more client devices described above. It will be recognized that although the components of the character recognition enhancement system 102 are shown to be separate in FIG. 10, any of the subcomponents may be combined into fewer components, such as into a single component, or divided into more components as may serve a particular implementation. Furthermore, although the components of FIG. 10 are described in connection with the character recognition enhancement system 102, at least some of the components for performing operations in conjunction with the character recognition enhancement system 102 described herein may be implemented on other devices within the environment.

The components of the character recognition enhancement system 102 can include software, hardware, or both. For example, the components of the character recognition enhancement system 102 can include one or more instructions stored on a computer-readable storage medium and executable by processors of one or more computing devices (e.g., the computing device 1000). When executed by the one or more processors, the computer-executable instructions of the character recognition enhancement system 102 can cause the computing device 1000 to perform the methods described herein. Alternatively, the components of the character recognition enhancement system 102 can comprise hardware, such as a special purpose processing device to perform a certain function or group of functions. Additionally, or alternatively, the components of the character recognition enhancement system 102 can include a combination of computer-executable instructions and hardware.

Furthermore, the components of the character recognition enhancement system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the character recognition enhancement system 102 may be implemented as part of a stand-alone application on a personal computing device or a mobile device. Alternatively, or additionally, the components of the character recognition enhancement system 102 may be implemented in any application that allows creation and delivery of marketing content to users, including, but not limited to, applications in ADOBE® EXPERIENCE MANAGER and CREATIVE CLOUD®, such as ADOBE ACROBAT®, LIGHTROOM®, and INDESIGN®. "ADOBE," "ADOBE EXPERIENCE MANAGER," "CREATIVE CLOUD," "ACROBAT," "LIGHTROOM," and "INDESIGN" are either registered trademarks or trademarks of Adobe Inc. in the United States and/or other countries.

FIGS. 1-10 the corresponding text, and the examples provide a number of different systems, methods, and non-transitory computer readable media for enhancing character recognition for reverse text, vertical text, and/or atypically-sized text utilizing an object detection machine learning model and an edge based adaptive binarization model. In addition to the foregoing, embodiments can also be described in terms of flowcharts comprising acts for accomplishing a particular result. For example, FIGS. 11-13 illustrate flowcharts an example sequences or series of acts in accordance with one or more embodiments.

Figure 11:
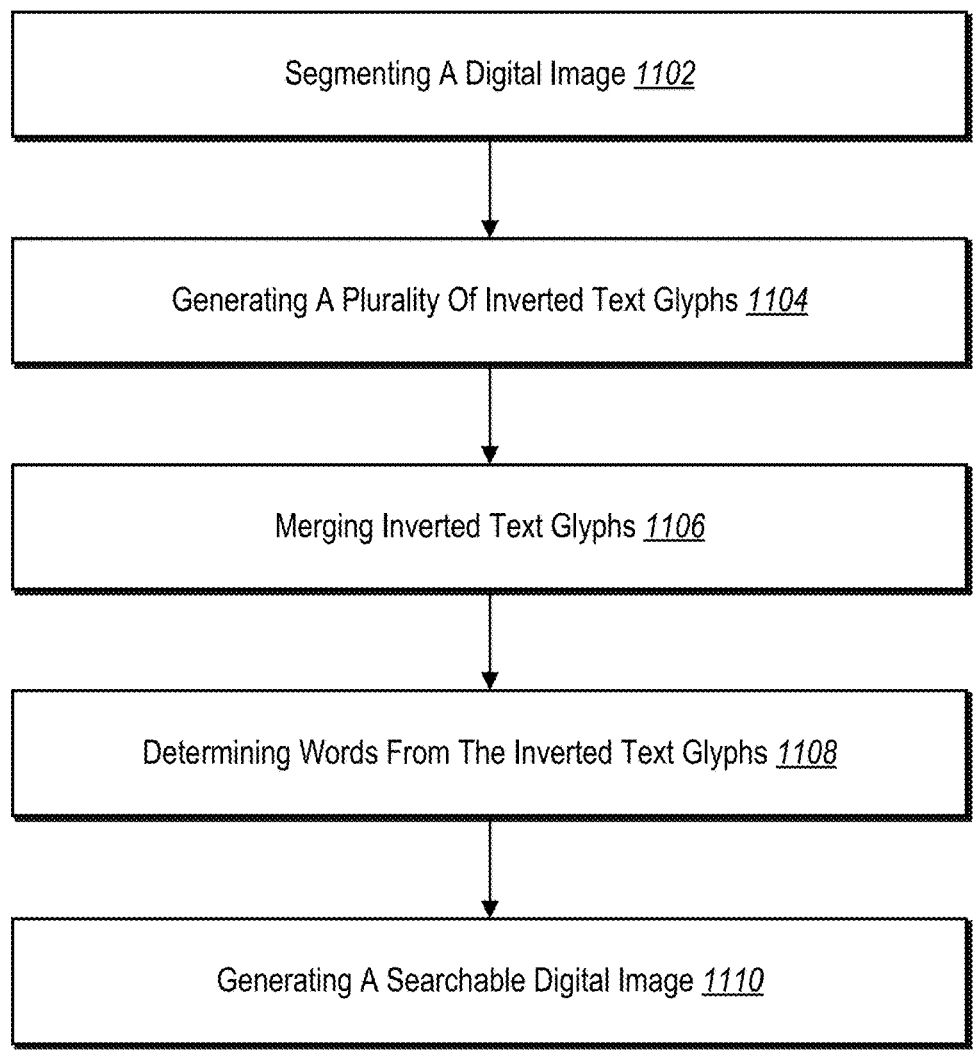
FIG. 11 illustrates a flowchart of a series of acts for enhancing character recognition for reverse text utilizing an object detection machine learning model and an edge based adaptive binarization model in accordance with one or more embodiments.
Figure 12:
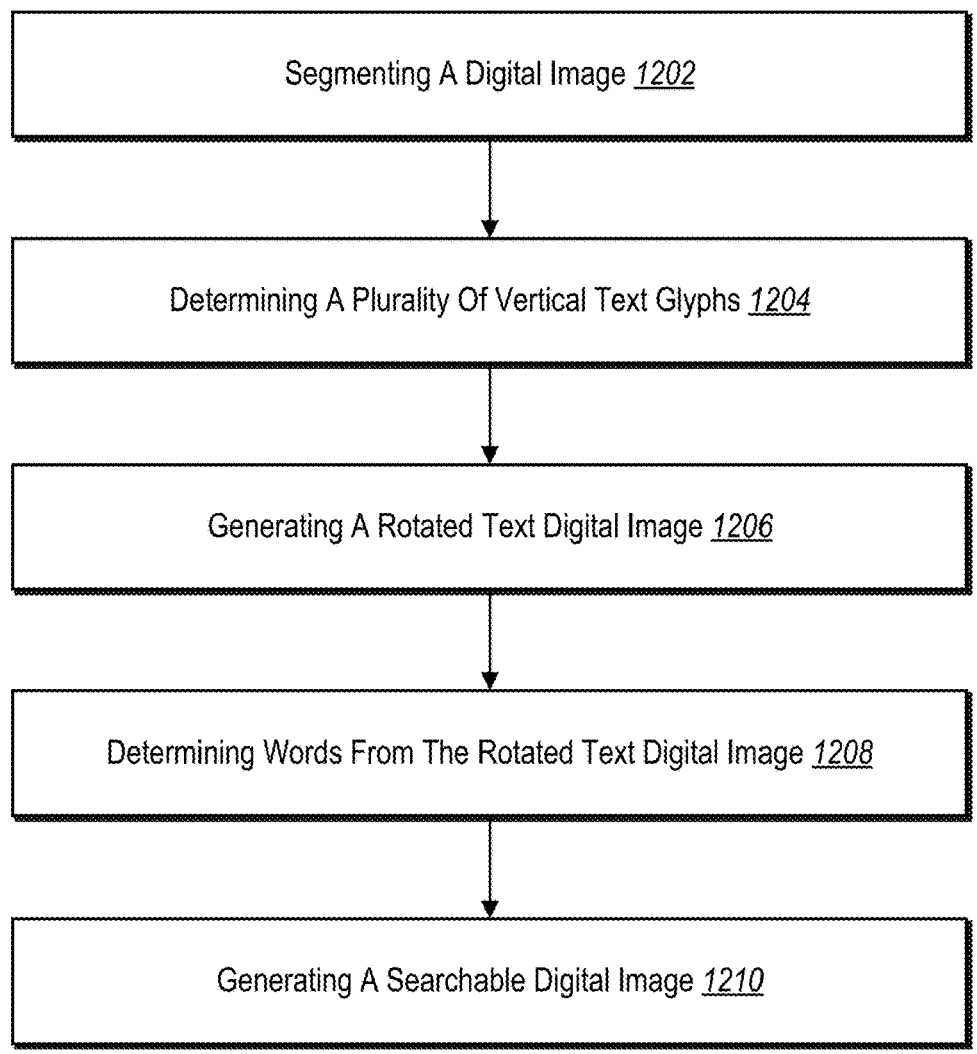
FIG. 12 illustrates a flowchart of a series of acts for enhancing character recognition for vertical text utilizing an object detection machine learning model and an edge based adaptive binarization model in accordance with one or more embodiments.
Figure 13:
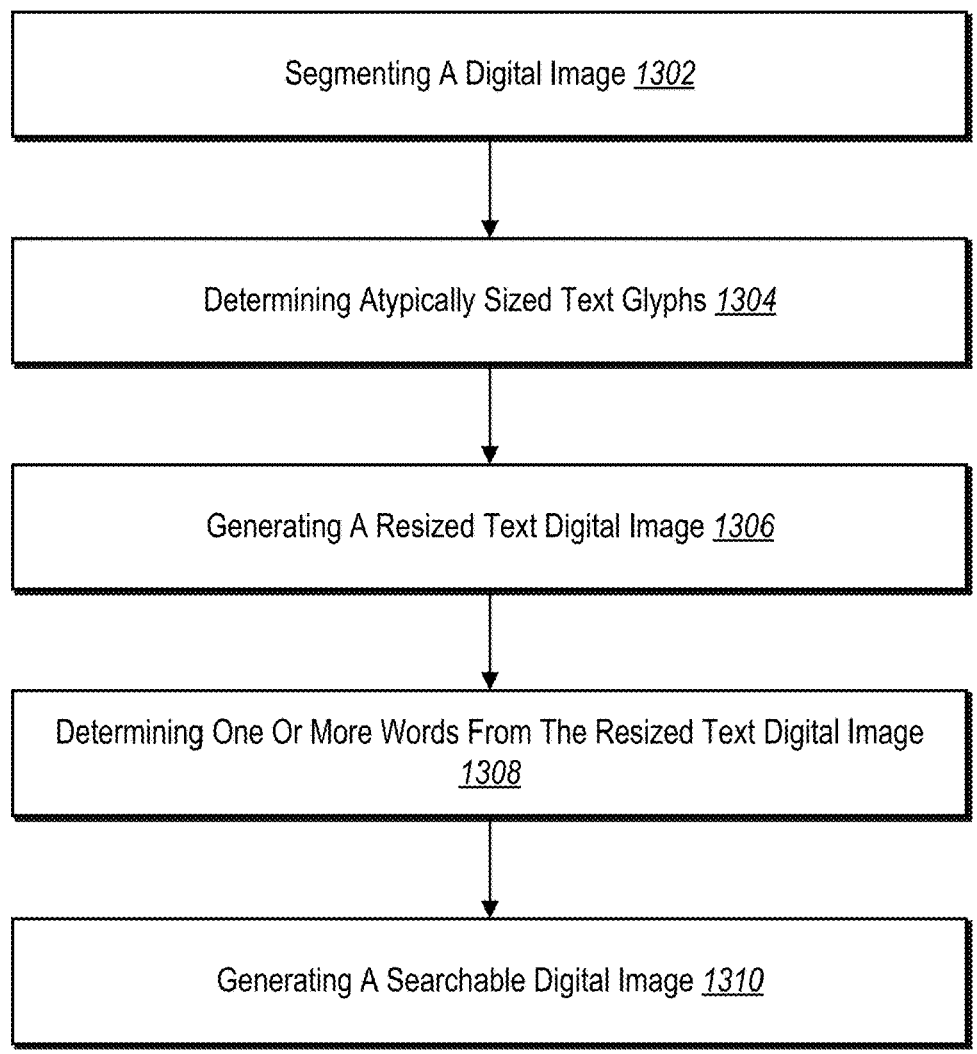
FIG. 13 illustrates a flowchart of a series of acts for enhancing character recognition for atypically-sized text utilizing an object detection machine learning model and an edge based adaptive binarization model.

While FIGS. 11-13 illustrate acts according to particular embodiments, alternative embodiments may omit, add to, reorder, and/or modify any of the acts shown in FIGS. 11-13. The acts of FIGS. 11-13 can be performed as part of a method. Alternatively, a non-transitory computer readable medium can comprise instructions, that when executed by one or more processors, cause a computing device to perform the acts of FIGS. 11-13. In still further embodiments, a system can perform the acts of FIGS. 11-13. Additionally, the acts described herein may be repeated or performed in parallel with one another or in parallel with different instances of the same or other similar acts.

FIG. 11 illustrates an example series of acts 1100 for enhancing character recognition for reverse text utilizing an object detection machine learning model and an edge based adaptive binarization model. In particular, the series of acts 1100 includes an act 1102 of segmenting a digital image. For example, the act 1102 involves segmenting a digital image into a plurality of text regions and one or more non-text regions utilizing an object detection machine learning model.

As shown, the series of acts 1100 includes an act 1104 of generating a plurality of inverted text glyphs. In particular, the act 1104 involves generating a plurality of inverted text glyphs from a reverse text region of the plurality of text regions utilizing an edge based adaptive binarization model. For example, the act 1104 involves utilizing the edge based adaptive binarization model to: invert a color scheme associated with the reverse text region by swapping a background color and a glyph color within the reverse text region, convert, from the inverted color scheme, the glyph color to black and the background color to white for the reverse text region, and generate, from the converted glyph color and the converted background color, bounding boxes for individual glyphs to indicate the plurality of inverted text glyphs.

In addition, the series of acts 1100 includes an act 1106 of merging inverted text glyphs. In particular, the act 1106 involves merging inverted text glyphs from the plurality of inverted text glyphs into an inverted text glyph group associated with the reverse text region. For example, the act 1106 involves determining bounding boxes for individual inverted text glyphs within the reverse text region. In some cases, the act 1106 also involves combining two or more of the bounding boxes that are along a common line within the reverse text region into a combined bounding box. In one or more embodiments, the act 1106 involves merging, into the inverted text glyph group, the combined bounding box with one or more additional combined bounding boxes on different lines within the reverse text region.

In some embodiments, the act 1106 involves combining the two or more the bounding boxes in response to determining that the two or more of the bounding boxes are within the common line within the reverse text region and within a threshold horizontal distance of each other. Additionally, the act 1106 can involve merging the combined bounding box with the one or more additional combined bounding boxes in response to determining that the combined bounding box and the one or more additional combined bounding boxes are on different lines within the reverse text region and within a threshold vertical distance of each other.

Further, the series of acts 1100 includes an act 1108 of determining words from the inverted text glyphs. In particular, the act 1108 involves determining one or more words from the inverted text glyph group utilizing an optical character recognition model. For example, the act 1108 involves generating a modified digital image by replacing the reverse text region from the digital image with the inverted text glyph group. In some embodiments, the act 1108 involves utilizing the optical character recognition model to determine words within the modified digital image.

Additionally, the series of acts 1100 includes an act 1110 of generating a searchable digital image. In particular, the act 1110 involves generating, for display on a client device, a searchable digital image from the one or more words. In some cases, the act 1110 involves modifying the reverse text region of the digital image to include searchable text from the one or more words of the inverted text glyph group.

The series of acts 1100 can include an act of identifying the reverse text region within the digital image from among the plurality of text regions and an act of determining that the digital image belongs to a reverse text category of digital images in response to identifying the reverse text region.

FIG. 12 illustrates an example series of acts 1200 for enhancing character recognition for vertical text utilizing an object detection machine learning model and an edge based adaptive binarization model. In particular, the series of acts 1200 includes an act 1202 of segmenting a digital image. For example, the act 1202 involves segmenting the digital image into a plurality of text regions and one or more non-text regions utilizing the object detection machine learning model.

As shown, the series of acts 1200 also includes an act 1204 of determining a plurality of vertical text glyphs. In particular, the act 1204 involves determining a plurality of vertical text glyphs from a vertical text region of the plurality of text regions utilizing the edge based adaptive binarization model. For example, the act 1204 involves determining, within the vertical text region of the digital image, one or more of upright vertical text glyphs or sideways vertical text glyphs utilizing the edge based adaptive binarization model. In some cases, the act 1204 involves generating bounding boxes for glyphs within the digital image, generating a dilated digital image by dilating the digital image and the bounding boxes in a horizontal direction, and selecting, for the plurality of vertical text glyphs, one or more of the bounding boxes that are vertically aligned within the dilated digital image. Determining vertically aligned bounding boxes can include filtering out a bounding box that is horizontally aligned with respect to the dilated digital image and filtering out a bounding box with one or more of a width exceeds a width threshold or a height that exceeds a height threshold.

In addition, the series of acts 1200 includes an act 1206 of generating a rotated text digital image. In particular, the act 1206 involves generating a rotated text digital image comprising one or more rotated versions of vertical text glyphs from the plurality of vertical text glyphs. For example, the act 1206 involves extracting the vertical text region from the digital image, generating a plurality of rotated variations of the vertical text glyphs from the vertical text region, and generating the rotated text digital image to include the plurality of rotated variations of the vertical text glyphs. Generating the rotated variations of the vertical text glyphs can include rotating a set of vertical text glyphs ninety degrees in a given direction, rotating the set of vertical text glyphs two hundred seventy degrees in the given direction, and rotating individual vertical glyphs within the set of vertical text glyphs to appear horizontal and upright.

Further, the series of acts 1200 includes an act 1208 of determining words from the rotated text digital image. In particular, the act 1208 involves determining one or more words from the rotated text digital image utilizing an optical character recognition model.

Additionally, the series of acts 1200 includes an act 1210 of generating a searchable digital image. In particular, the act 1210 involves generating, for display on a client device, a searchable digital image from the one or more words.

In some embodiments, the series of acts 1200 includes an act of identifying the vertical text region within the digital image and an act of determining that the digital image belongs to a vertical text category of digital images in response to identifying the vertical text region. Further, the series of acts 1200 can involve an act of providing, to the client device in response to determining the one or more words from the rotated text digital image, one or more of a position within the digital image of a first bounding box associated with the vertical text glyphs, a position within the rotated text digital image of a second bounding box associated with the one or more rotated versions of the vertical text glyphs, an angle between an orientation of the first bounding box and an orientation of the second bounding box, or an indication that the first bounding box is a vertical text bounding box.

FIG. 13 illustrates an example series of acts 1300 for enhancing character recognition for atypically-sized text utilizing an object detection machine learning model and an edge based adaptive binarization model. In particular, the series of acts 1300 includes an act 1302 of segmenting a digital image. For example, the act 1302 involves segmenting a digital image into a plurality of text regions and one or more non-text regions utilizing an object detection machine learning model.

As shown, the series of acts 1300 also includes an act 1304 of determining atypically-sized text glyphs. In particular, the act 1304 involves determining atypically-sized text glyphs from an atypically-sized text region of the plurality of text regions utilizing an edge based adaptive binarization model. For example, the act 1304 involves filtering out glyphs from the digital image with sizes that are between a maximum size threshold and a minimum size threshold.

In addition, the series of acts 1300 includes an act 1306 of generating a resized text digital image. In particular, the act 1306 involves generating a resized text digital image comprising a resized version of the atypically-sized text glyphs. For example, the act 1306 involves resizing the atypically-sized text glyphs to a size between a maximum size threshold and a minimum size threshold and generating the resized text digital image to include only the resized version of the atypically-sized text glyphs.

Further, the series of acts 1300 includes an act 1308 of determining one or more words from the resized text digital image. In particular, the act 1308 involves determining one or more words from the resized text digital image utilizing an optical character recognition model.

Additionally, the series of acts 1300 includes an act 1310 of generating a searchable digital image. In particular, the act 1310 involves generating, for display on a client device, a searchable digital image from the one or more words. For example, the act 1310 involves modifying the digital image to depict the plurality of atypically text glyphs in searchable form according to the one or more words determined from the resized text digital image.

In some embodiments, the series of acts 1300 includes an act of identifying the atypically-sized text region within the digital image and an act of determining that the digital image belongs to an atypically-sized text category of digital images in response to identifying the atypically-sized text region.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
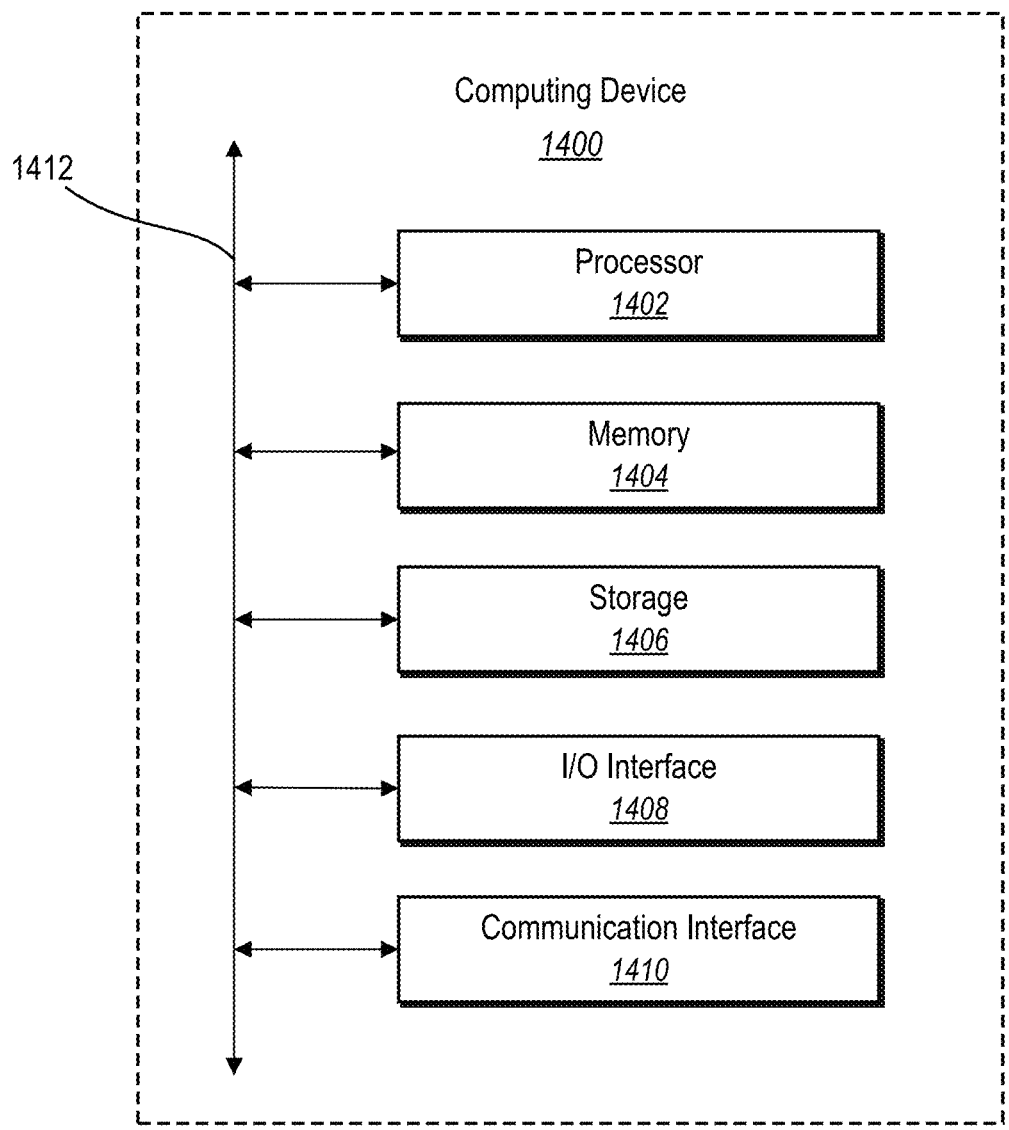
FIG. 14 illustrates a block diagram of an example computing device in accordance with one or more embodiments.

FIG. 14 illustrates, in block diagram form, an example computing device 1400 (e.g., the computing device 1000, the client device 108, and/or the server(s) 104) that may be configured to perform one or more of the processes described above. One will appreciate that the character recognition enhancement system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
    segment a digital image into a plurality of text regions and one or more non-text regions utilizing an object detection machine learning model;
    generate a plurality of inverted text glyphs from a reverse text region of the plurality of text regions utilizing an edge based adaptive binarization model, wherein the reverse text region depicts text characters in a text color lighter than a lightness threshold overlaid on background pixels in a background color darker than a darkness threshold;
    merge inverted text glyphs from the plurality of inverted text glyphs into an inverted text glyph group associated with the reverse text region;
    determine, utilizing the edge based adaptive binarization model, a vertical text region within the digital image by dilating the digital image in a horizontal direction and comparing dimensions of dilated bounding boxes of the plurality of text regions based on dilating the digital image, wherein the vertical text region comprises a bounding box of text characters oriented vertically with respect to the digital image;
    generate, from the vertical text region, a rotated text digital image comprising multiple rotated versions of the vertical text region;
    determine one or more words from the rotated text digital image and the inverted text glyph group utilizing an optical character recognition model; and
    generate, for display on a client device, a searchable digital image from the one or more words.

2. The non-transitory computer readable medium of claim 1, further comprising instructions that, when executed by the at least one processor, cause the computing device to generate the plurality of inverted text glyphs by utilizing the edge based adaptive binarization model to:
    invert a color scheme associated with the reverse text region by swapping a background color and a glyph color within the reverse text region;
    convert, from the inverted color scheme, the glyph color to black and the background color to white for the reverse text region; and
    generate, from the converted glyph color and the converted background color, bounding boxes for individual glyphs to indicate the plurality of inverted text glyphs.

3. The non-transitory computer readable medium of claim 1, further comprising instructions that, when executed by the at least one processor, cause the computing device to merge the inverted text glyphs into the inverted text glyph group by:
    determining bounding boxes for individual inverted text glyphs within the reverse text region;
    determining that two or more of the bounding boxes for the individual inverted text glyphs correspond to reverse text glyphs along a common line within the reverse text region;
    combining the two or more of the bounding boxes that are along the common line into a combined bounding box; and
    merging, into the inverted text glyph group, the combined bounding box with one or more additional combined bounding boxes corresponding to different lines within the reverse text region.

4. The non-transitory computer readable medium of claim 3, further comprising instructions that, when executed by the at least one processor, cause the computing device to:
    combine the two or more the bounding boxes in response to determining that the two or more of the bounding boxes are within the common line within the reverse text region and within a threshold horizontal distance of each other; and
    merge the combined bounding box with the one or more additional combined bounding boxes in response to determining that the combined bounding box and the one or more additional combined bounding boxes are on different lines within the reverse text region and within a threshold vertical distance of each other.

5. The non-transitory computer readable medium of claim 1, further comprising instructions that, when executed by the at least one processor, cause the computing device to determine the vertical text region by determining one or more of:
    a first vertically orientated bounding box including vertically arranged glyphs; or a second vertically orientated bounding box including horizontally arranged glyphs.

6. The non-transitory computer readable medium of claim 1, further comprising instructions that, when executed by the at least one processor, cause the computing device to:
    identify the reverse text region within the digital image from among the plurality of text regions; and
    determine that the digital image belongs to a reverse text category of digital images in response to identifying the reverse text region.

7. The non-transitory computer readable medium of claim 1, further comprising instructions that, when executed by the at least one processor, cause the computing device to generate the rotated text digital image by:
  generating a first rotated version of the vertical text region by rotating the vertical text region by a first magnitude;
  generating a second rotated version of the vertical text region by rotating the vertical text region by a second magnitude; and
  including the first rotated version and the second rotated version in the rotated text digital image.

8. A system comprising:
one or more memory devices; and
one or more processors configured to cause the system to:
  segment a digital image into a plurality of text regions and one or more non-text regions utilizing an object detection machine learning model;
  generate a plurality of inverted text glyphs from a reverse text region of the plurality of text regions utilizing an edge based adaptive binarization model, wherein the reverse text region depicts text characters in a text color lighter than a lightness threshold overlaid on background pixels in a background color darker than a darkness threshold;
  merge inverted text glyphs from the plurality of inverted text glyphs into an inverted text glyph group associated with the reverse text region;
  determine, utilizing the edge based adaptive binarization model, a vertical text region within the digital image by dilating the digital image in a horizontal direction and comparing dimensions of dilated bounding boxes of the plurality of text regions based on dilating the digital image, wherein the vertical text region comprises a bounding box of text characters oriented vertically with respect to the digital image;
  generate, from the vertical text region, a rotated text digital image comprising multiple rotated versions of the vertical text region;
  determine one or more words from the rotated text digital image and the inverted text glyph group utilizing an optical character recognition model; and
  generate, for display on a client device, a searchable digital image from the one or more words.

9. The system of claim 8, wherein the one or more processors are further configured to cause the system to generate the plurality of inverted text glyphs by utilizing the edge based adaptive binarization model to:
  invert a color scheme associated with the reverse text region by swapping a background color and a glyph color within the reverse text region;
  convert, from the inverted color scheme, the glyph color to black and the background color to white for the reverse text region; and
  generate, from the converted glyph color and the converted background color, bounding boxes for individual glyphs to indicate the plurality of inverted text glyphs.

10. The system of claim 8, wherein the one or more processors are further configured to cause the system to merge the inverted text glyphs into the inverted text glyph group by:
  determining bounding boxes for individual inverted text glyphs within the reverse text region;
  determining that two or more of the bounding boxes for the individual inverted text glyphs correspond to reverse text glyphs along a common line within the reverse text region;
  combining the two or more of the bounding boxes that are along the common line into a combined bounding box; and
  merging, into the inverted text glyph group, the combined bounding box with one or more additional combined bounding boxes corresponding to different lines within the reverse text region.

11. The system of claim 10, wherein the one or more processors are further configured to cause the system to:
  combine the two or more the bounding boxes in response to determining that the two or more of the bounding boxes are within the common line within the reverse text region and within a threshold horizontal distance of each other; and
  merge the combined bounding box with the one or more additional combined bounding boxes in response to determining that the combined bounding box and the one or more additional combined bounding boxes are on different lines within the reverse text region and within a threshold vertical distance of each other.

12. The system of claim 8, wherein the one or more processors are further configured to determine the vertical text region by determining one or more of:
  a first vertically orientated bounding box including vertically arranged glyphs; or
  a second vertically orientated bounding box including horizontally arranged glyphs.

13. The system of claim 8, wherein the one or more processors are further configured to cause the system to:
  identify the reverse text region within the digital image from among the plurality of text regions; and
  determine that the digital image belongs to a reverse text category of digital images in response to identifying the reverse text region.

14. The system of claim 8, wherein the one or more processors are further configured to cause the system to generate the rotated text digital image by:
  generating a first rotated version of the vertical text region by rotating the vertical text region by a first magnitude;
  generating a second rotated version of the vertical text region by rotating the vertical text region by a second magnitude; and
  including the first rotated version and the second rotated version in the rotated text digital image.

15. A computer-implemented method comprising:
  segmenting a digital image into a plurality of text regions and one or more non-text regions utilizing an object detection machine learning model;
  generating a plurality of inverted text glyphs from a reverse text region of the plurality of text regions utilizing an edge based adaptive binarization model, wherein the reverse text region depicts text characters in a text color lighter than a lightness threshold overlaid on background pixels in a background color darker than a darkness threshold;
  merging inverted text glyphs from the plurality of inverted text glyphs into an inverted text glyph group associated with the reverse text region;
  determining, utilizing the edge based adaptive binarization model, a vertical text region within the digital image by dilating the digital image in a horizontal direction and comparing dimensions of dilated bounding boxes of the plurality of text regions based on dilating the digital image, wherein the vertical text region comprises a bounding box of text characters oriented vertically with respect to the digital image;

generating, from the vertical text region, a rotated text digital image comprising multiple rotated versions of the vertical text region;

determining one or more words from the rotated text digital image and the inverted text glyph group utilizing an optical character recognition model; and generating, for display on a client device, a searchable digital image from the one or more words.

16. The computer-implemented method of claim 15, wherein generating the plurality of inverted text glyphs comprises utilizing the edge based adaptive binarization model to:

invert a color scheme associated with the reverse text region by swapping a background color and a glyph color within the reverse text region;

convert, from the inverted color scheme, the glyph color to black and the background color to white for the reverse text region; and generate, from the converted glyph color and the converted background color, bounding boxes for individual glyphs to indicate the plurality of inverted text glyphs.

17. The computer-implemented method of claim 15, wherein merging the inverted text glyphs into the inverted text glyph group comprises:

determining bounding boxes for individual inverted text glyphs within the reverse text region;

determining that two or more of the bounding boxes for the individual inverted text glyphs correspond to reverse text glyphs along a common line within the reverse text region;

combining the two or more of the bounding boxes that are along the common line into a combined bounding box; and merging, into the inverted text glyph group, the combined bounding box with one or more additional combined bounding boxes corresponding to different lines within the reverse text region.

18. The computer-implemented method of claim 17, further comprising:

combining the two or more the bounding boxes in response to determining that the two or more of the bounding boxes are within the common line within the reverse text region and within a threshold horizontal distance of each other; and merging the combined bounding box with the one or more additional combined bounding boxes in response to determining that the combined bounding box and the one or more additional combined bounding boxes are on different lines within the reverse text region and within a threshold vertical distance of each other.

19. The computer-implemented method of claim 15, wherein determining the vertical text region comprises determining one or more of:

a first vertically orientated bounding box including vertically arranged glyphs; or a second vertically orientated bounding box including horizontally arranged glyphs.

20. The computer-implemented method of claim 15, further comprising:

identifying the reverse text region within the digital image from among the plurality of text regions; and determining that the digital image belongs to a reverse text category of digital images in response to identifying the reverse text region.

* * * * *